United States Patent
Xu et al.

(10) Patent No.: US 12,328,627 B2
(45) Date of Patent: Jun. 10, 2025

(54) ELECTRONIC APPARATUS, RADIO COMMUNICATION METHOD, AND COMPUTER-READABLE STORAGE MEDIUM

(71) Applicant: Sony Group Corporation, Tokyo (JP)

(72) Inventors: Xiaodong Xu, Beijing (CN); Shumeng Zhang, Beijing (CN); Yingting Yuan, Beijing (CN); Rui Liu, Beijing (CN); Guanyu Chen, Beijing (CN); Zhihan Huang, Beijing (CN); Jinghang Liu, Beijing (CN); Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 408 days.

(21) Appl. No.: 17/921,149

(22) PCT Filed: Apr. 30, 2021

(86) PCT No.: PCT/CN2021/091236
§ 371 (c)(1),
(2) Date: Oct. 25, 2022

(87) PCT Pub. No.: WO2021/223666
PCT Pub. Date: Nov. 11, 2021

(65) Prior Publication Data
US 2023/0180068 A1 Jun. 8, 2023

(30) Foreign Application Priority Data
May 6, 2020 (CN) .......................... 202010372474.4

(51) Int. Cl.
*H04W 36/00* (2009.01)
*H04W 36/08* (2009.01)

(52) U.S. Cl.
CPC ... *H04W 36/0058* (2018.08); *H04W 36/0033* (2013.01); *H04W 36/08* (2013.01)

(58) Field of Classification Search
CPC ......... H04W 36/0058; H04W 36/0033; H04W 36/08
See application file for complete search history.

(56) References Cited

U.S. PATENT DOCUMENTS

2019/0037468 A1* 1/2019 Bongaarts ........... H04W 36/324
2019/0253945 A1* 8/2019 Paladugu .......... H04W 12/0433
(Continued)

FOREIGN PATENT DOCUMENTS

CN 110167093 A 8/2019
CN 110945908 A 3/2020
(Continued)

OTHER PUBLICATIONS

International Search Report and Written Opinion mailed on Jul. 21, 2021, received for PCT Application PCT/CN2021/091236, filed on Apr. 30, 2021, 11 pages including English Translation.
(Continued)

*Primary Examiner* — Fahmida S Chowdhury
(74) *Attorney, Agent, or Firm* — XSENSUS LLP

(57) ABSTRACT

An electronic apparatus includes a processing circuit configured to: determine a topological position of an IAB node in an IAB network at a subsequent moment, the topological position including a parent node and a donor node of the IAB node; sending a handover request to a donor node of the IAB node of the subsequent moment, so as to request that a handover of the IAB node to the parent node and the donor node of the subsequent moment is performed at the subsequent moment; and sending a handover notification to a donor node of the IAB node of a current moment, the notification comprising the topological position of the IAB
(Continued)

node of the subsequent moment, such that the IAB node is connected, on a control plane, to both the donor node of the current moment and the donor node of the subsequent moment.

12 Claims, 19 Drawing Sheets

(56) References Cited

U.S. PATENT DOCUMENTS

| | | | |
|---|---|---|---|
| 2020/0068567 A1* | 2/2020 | Islam | H04L 5/0055 |
| 2020/0374164 A1* | 11/2020 | Baldemair | H04L 5/0048 |
| 2021/0084506 A1* | 3/2021 | Kimba Dit Adamou | |
| | | | H04W 40/22 |
| 2021/0258847 A1* | 8/2021 | Wu | H04W 24/02 |
| 2021/0345273 A1* | 11/2021 | Xing | G01S 19/05 |
| 2022/0007275 A1* | 1/2022 | Li | H04W 72/21 |
| 2022/0141732 A1* | 5/2022 | Wu | H04W 36/0077 |
| | | | 370/331 |
| 2022/0182905 A1* | 6/2022 | Xu | H04W 36/302 |
| 2022/0232494 A1* | 7/2022 | Sandgren | H04W 56/0025 |
| 2022/0352962 A1* | 11/2022 | Huang | H04B 7/0695 |
| 2022/0408275 A1* | 12/2022 | Awada | H04W 16/26 |
| 2023/0083061 A1* | 3/2023 | Korhonen | H04W 56/0015 |
| | | | 455/517 |
| 2023/0147090 A1* | 5/2023 | Christoffersson | |
| | | | H04W 36/0055 |
| | | | 370/331 |

FOREIGN PATENT DOCUMENTS

| | | |
|---|---|---|
| JP | 2015526915 A | 9/2015 |
| WO | 2019/161099 A1 | 8/2019 |
| WO | WO-2019246446 A1 | 12/2019 |
| WO | WO-2020066605 A1 | 4/2020 |

OTHER PUBLICATIONS

Huawei, "Basic principles for IAB topology adaptation", 3GPP TSG-RAN WG2 #103, R2-1812833, Aug. 20-24, 2018, pp. 1-4.
Huawei, "Inter IAB donor-CU topology adaptation", 3GPP TSG-RAN WG3 Meeting #105bis, R3-195469, Oct. 14-18, 2019, pp. 1-4.
CATT: "(TP for NR_IAB BL CR for TS 38.401) Inter-CU IAB-node migration",3GPP Draft; R3-196959, 3rd Generation Partnership Project (3GPP), Mobile Competence Centre ;650, Route Des Lucioles; F-06921 Sophia-Antipolis Cedex; France, vol. RAN WG3, No. Reno, NV, USA; Nov. 18, 2019-Nov. 22, 2019 Nov. 8, 2019 (Nov. 8, 2019), XP051820619.
Ericsson: "User Plane Aspects of Supporting NR-DC for IAB Nodes", 3GPP Draft; R2-1906998—User Plane Aspects of Supporting NR-DC for IAB Nodes, 3rd Generation Partnership Project (3GPP), Mobile Competence Centre ; 650, Route Des Lucioles ; F-06921 Sophia-Antipolis, vol. RAN WG2, No. Reno, NV, USA; May 13, 2019-May 17, 2019 May 13, 2019 (May 13, 2019), XP051730448.
Huawei, Hisilicon, "Discussion on duplication during handover procedure", 3GPP TSG RAN WG2 #105bis, R2-1903568, Xi'an, China, Apr. 8-12, 2019, pp. 1-5.

* cited by examiner

ELECTRONIC APPARATUS, RADIO COMMUNICATION METHOD, AND COMPUTER-READABLE STORAGE MEDIUM

CROSS-REFERENCE TO RELATED APPLICATIONS

This application is based on PCT filing PCT/CN2021/091236, filed Apr. 30, 2021, which claims the priority to Chinese Patent Application No. 202010372474.4 titled "ELECTRONIC APPARATUS, RADIO COMMUNICATION METHOD, AND COMPUTER-READABLE STORAGE MEDIUM", filed on May 6, 2020 with the China National Intellectual Property Administration (CNIPA), the entire contents of each of which are incorporated herein by reference in its entirety.

FIELD

Embodiments of the present disclosure generally relate to the field of wireless communications, and in particular to an electronic device, a wireless communication method, and a computer-readable storage medium. Specially, the present disclosure relates to an electronic device for a core network in a wireless communication system, an electronic device for a donor node in a wireless communication system, an electronic device for an integrated access and backhaul (IAB) node in a wireless communication system, an electronic device as a user equipment in a wireless communication system, a wireless communication method performed by an electronic device in a core network, a wireless communication method performed by a donor node, a wireless communication method performed by an IAB node, a wireless communication method performed by a user equipment, and a computer-readable storage medium.

BACKGROUND

Compared with a LTE communication system, a 5G new radio (NR) communication system may use a wider bandwidth, such as millimeter wave band, and may use large-scale antenna and a multi-beam system. Therefore, 5G may provide a higher system rate and provide a condition for IAB technology. In an IAB network, a donor node (such as an IAB donor) may be connected to a core network through a cable, and an IAB node as a relay is directly or indirectly connected to the donor node, so as to connect to the core network. The donor node further serves as a donor base station. The IAB node integrates a wireless access link and a wireless backhaul (BH) link. The access link is a communication link between UE and the IAB node, and the backhaul link is a communication link between IAB nodes or between the IAB node and the donor base station. A user equipment (UE) may be connected to the IAB node or the donor node. That is, the UE may be connected to the donor node through one or more IAB nodes or directly to the donor node. IAB technology is more suitable for a dense scenario, which can reduce a burden of deploying a wired transmission network and expand coverage of a cell.

FIG. 1 is a schematic structural diagram showing an IAB network. As shown in FIG. 1, an IAB donor node A is connected to the core network, an IAB node B and an IAB node C are connected to the IAB donor node A through the backhaul link, and the user equipment in the network may be connected to the IAB node, or connected to the IAB donor node.

An important application scenario of the IAB technology is high-speed train. FIG. 2 is a schematic diagram showing a scenario in which IAB technology is applied to a train. In FIG. 2, a train with a length L travels along a rail, one or more access devices are arranged on the train, and the access devices may serve as IAB nodes in the IAB network. Users on the train, such as UE1 and UE2, are connected to the access devices through the access link. The access devices are connected to an eNB close to the rail through the backhaul link. The eNB close to the rail may serve as an IAB node in the IAB network, and is directly connected to the IAB donor node or connected to the IAB donor node through another IAB node. Due to rapid movement of the train, the access devices may be switched from an IAB donor node to another IAB donor node. There is a delay from a time instant when the access devices are disconnected from a source IAB donor node to a time instant when the access devices are connected to a new IAB donor node. A time period is required for performing radio link failure (RLF) detection after the access devices are connected to the new IAB donor node, resulting in a loss of service for a UE connected to the access devices and service interruption. During a time period from the time instant when the access devices are disconnected from a source IAB donor node to a time instant when the UE re-accesses the network after RLF discovery, the UE is in a state of service interruption. It can be seen that the UE loses service fora long time.

Therefore, it is required to propose a technical solution to optimize a switching process in an IAB network, so as to avoid interruption of service for the UE or reduce a time period for which service for the UE is interrupted.

SUMMARY

This section provides a general summary of the present disclosure, rather than a comprehensive disclosure of full scope or all features of the present disclosure.

An electronic device, a wireless communication method and a computer-readable storage medium are provided according to the present disclosure, to optimize a switching process in an IAB network, so as to avoid interruption of service for the UE or reduce a time period for which service for the UE is interrupted.

An electronic device is provided according to an aspect of the present disclosure. The electronic device includes processing circuitry. The processing circuitry is configured to determine a topological position of an integrated access and backhaul (IAB) node in an IAB network at a next time instant, the topological position including a parent node and a donor node of the IAB node; send a switching request to the donor node of the IAB node at the next time instant, to request that the IAB node is switched at the next time instant to the parent node and the donor node at the next time instant; and send a switching notification to a donor node of the IAB node at a current time instant, the switching notification including the topological position of the IAB node at the next time instant, so that the IAB node is connected to both the donor node at the current time instant and the donor node at the next time instant on a control plane.

An electronic device is provided according to another aspect of the present disclosure. The electronic device includes processing circuitry. The processing circuitry is configured to receive a switching notification that includes a topological position of an integrated access and backhaul (IAB) node in an IAB network at a next time instant, the topological position including a parent node and a donor node of the IAB node; and send the switching notification to the IAB node, so that the IAB node is connected to both the electronic device and the donor node at the next time instant on a control plane.

An electronic device is provided according to another aspect of the present disclosure. The electronic device includes processing circuitry. The processing circuitry is configured to receive a switching notification from a donor node of the electronic device at a current time instant, where the switching notification includes a topological position of the electronic device in an integrated access and backhaul (IAB) network at a next time instant, and the topological position includes a parent node and a donor node of the electronic device; and connect the donor node at the next time instant on a control plane, and connect to the donor node at the current time instant on the control plane.

An electronic device is provided according to another aspect of the present disclosure. The electronic device includes processing circuitry. The processing circuitry is configured to receive a switching notification from an integrated access and backhaul (IAB) node connected to the electronic device, where the switching notification includes a parent node of the IAB node in an IAB network at a next time instant; establish connection with the parent node; and re-establish, after the IAB node is switched to the parent node, connection with the IAB node.

A wireless communication method performed by an electronic device is provided according to another aspect of the present disclosure. The wireless communication method includes determining a topological position of an integrated access and backhaul (IAB) node in an IAB network at a next time instant, the topological position including a parent node and a donor node of the IAB node; sending a switching request to the donor node of the IAB node at the next time instant, to request that the IAB node is switched at the next time instant to the parent node and the donor node at the next time instant; and sending a switching notification to a donor node of the IAB node at a current time instant, the switching notification including the topological position of the IAB node at the next time instant, so that the IAB node is connected to both the donor node at the current time instant and the donor node at the next time instant on a control plane.

A wireless communication method performed by an electronic device is provided according to another aspect of the present disclosure. The wireless communication method includes receiving a switching notification that includes a topological position of integrated access and backhaul (IAB) node in an IAB network at a next time instant, the topological position including a parent node and a donor node of the IAB node; and sending the switching notification to the IAB node, so that the IAB node is connected to both the electronic device and the donor node at the next time instant on a control plane.

A wireless communication method performed by an electronic device is provided according to another aspect of the present disclosure. The wireless communication method includes receiving a switching notification from a donor node of the electronic device at a current time instant, where the switching notification includes a topological position of the electronic device in an integrated access and backhaul (IAB) network at a next time instant, and the topological position includes a parent node and a donor node of the electronic device; and connecting the donor node at the next time instant on a control plane, and connecting to the donor node at the current time instant on the control plane.

A wireless communication method performed by an electronic device is provided according to another aspect of the present disclosure. The wireless communication method includes receiving a switching notification from an integrated access and backhaul (IAB) node connected to the electronic device, where the switching notification includes a parent node of the IAB node in an IAB network at a next time instant; establishing connection with the parent node; and re-establishing, after the IAB node is switched to the parent node, connection with the IAB node.

A computer readable storage medium is provided according to another aspect of the present disclosure. The computer readable storage medium includes an executable computer instruction that, when executed by a computer, causes the computer to perform the wireless communication method according to the present disclosure.

With the electronic device, the wireless communication method and the computer-readable storage medium according to the present disclosure, the electronic device in the core network may predict the parent node and the donor node of the IAB node, so that the IAB node may be connected to both the source donor node and the target donor node on the control plane. In this way, due to the double connection of the IAB node on the control plane, the service for the UE connected to the IAB node is not interrupted. Further, with the electronic device, the wireless communication method, and the computer-readable storage medium according to the present disclosure, a UE connected to the IAB node may be directly connected to the target parent node before the IAB node is switched to the target parent node, and the UE connected to the IAB node may be reconnected to the IAB node after the IAB node is switched to the target parent node. In this way, the UE may temporarily be served by the target parent node, thereby greatly reducing a time period for which the service for the UE is interrupted. In summary, a switching process in the IAB network may be optimized by using the electronic device, the wireless communication method and the computer-readable storage medium according to the present disclosure.

Further applicability areas are become apparent from the description provided herein. The description and specific examples in the summary are only schematic and are not intended to limit the scope of the present disclosure.

BRIEF DESCRIPTION OF THE DRAWINGS

Drawings described herein are only schematic for described embodiments, rather than all embodiments, and are not intended to limit the scope of the present disclosure. In the drawing.

Figure 1:
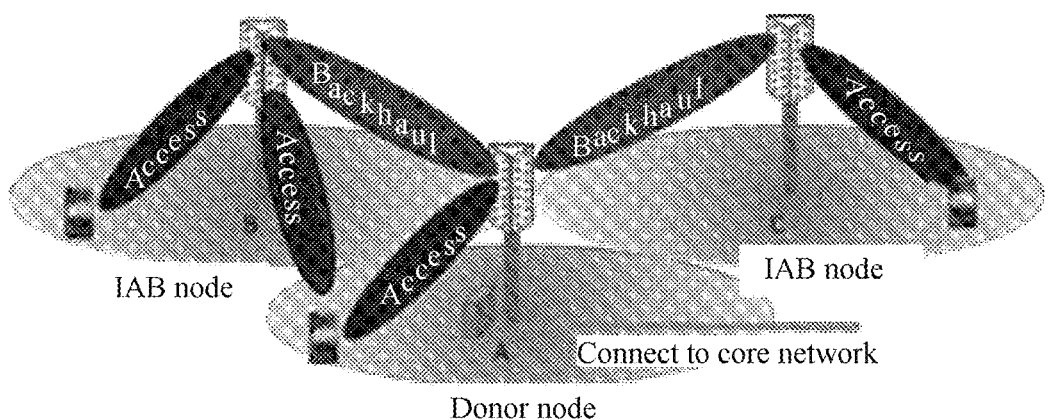
FIG. 1 is a schematic structural diagram showing an IAB network.
Figure 2:
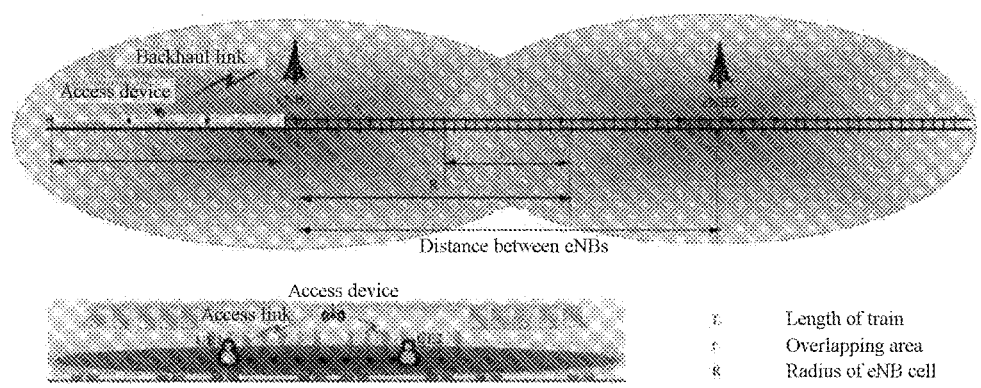
FIG. 2 is a schematic diagram showing a scenario in which IAB technology is applied to a train.

While the present disclosure is susceptible to various modifications and alternative forms, specific embodiments thereof have been shown by way of example in the drawings and are herein described in detail. It should be understood that the description for the specific embodiments herein is not intended to limit the present disclosure to the disclosed specific forms, but on the contrary, the present disclosure is intended to encompass all modifications, equivalents and alternatives that fall within the spirit and scope of the present disclosure. It should be noted that, reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or uses of the present disclosure.

Exemplary embodiments are provided to make the present disclosure be exhaustive and fully convey the scope of the present disclosure to those skilled in the art. Various specific details such as specific parts, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

Hereinafter, the present disclosure is described according to the following sequence.

1. Description of Scenarios.
2. Configuration Examples of Electronic Device for Core Network.
3. Configuration Examples of Electronic Device for IAB Donor Node.
4. Configuration Examples of Electronic Device for IAB Node.
5. Configuration Examples of User Equipment
6. Method Embodiments.
7. Application Examples.

1. Description of Scenarios

As described above, in a case that an IAB node is switched from an IAB donor node to another IAB donor node, a UE connected to the IAB node may lose service, resulting in service interruption.

In an IAB network, the IAB donor node may include a central unit (CU) and a distributed unit (DU). Specifically, the IAB donor node may include one CU that may be connected to one or more DUs, and the IAB node or the UE may be connected to the DU of the IAB donor node. In a case that the IAB node is switched between same DUs, and the IAB node is switched between same CUs and different DUs, the service for the UE connected to the IAB node is not interrupted. Only when the IAB node is switched between different CUs, the service of the UE connected to the IAB node is interrupted.

Figure 3:
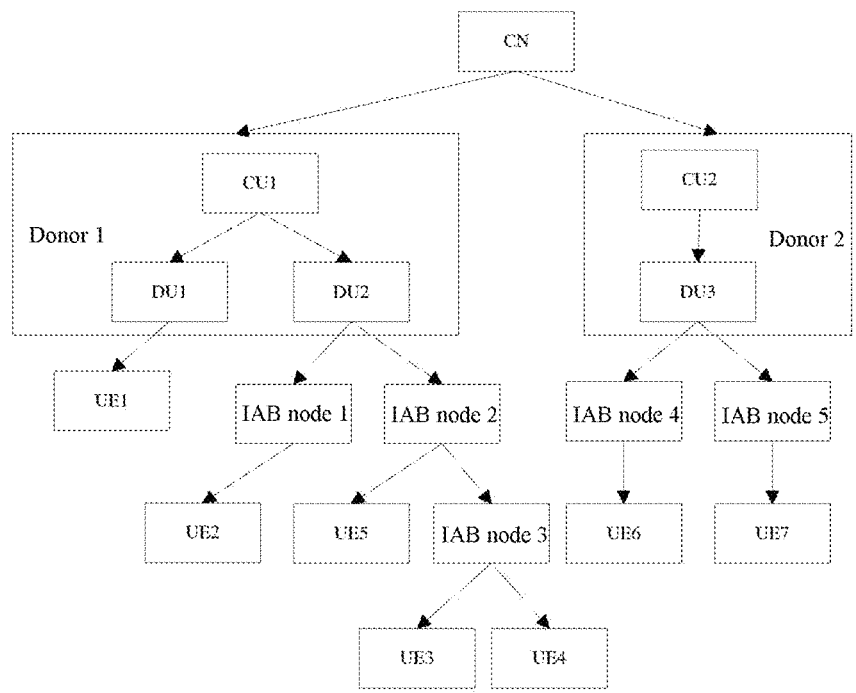
FIG. 3(*a*) and FIG. 3(*b*) are schematic diagrams showing a scenario of IAB nodes switched between different CUs.
Figure 3:
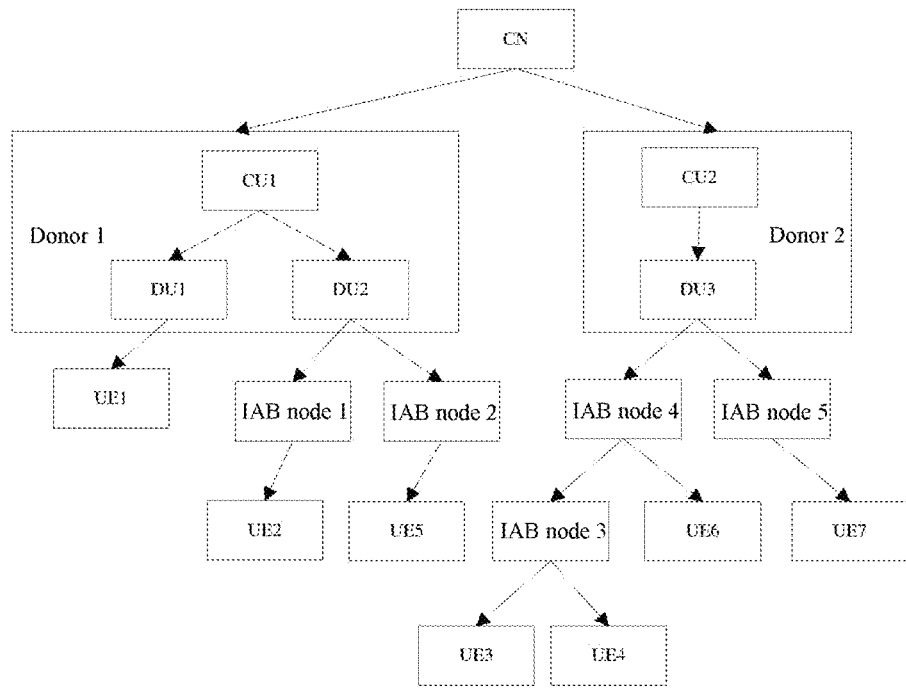

FIG. 3(*a*) and FIG. 3(*b*) are schematic diagrams showing a scenario of IAB nodes switched between different CUs.

As shown in FIG. 3(*a*), a donor node 1 and a donor node 2 are connected to a core network (CN) through cables. The donor node 1 includes CU1 connected to DU1 and DU2. UE1 is directly connected to DU1 through an access link. An IAB node 1 and an IAB node 2 are connected to DU2 through backhaul links. UE2 is connected to the IAB node 1 through an access link. UE5 and an IAB node 3 are connected to the IAB node 2 respectively through the access link and the backhaul link. UE3 and UE4 are connected to the IAB node 3 through access links. The donor node 2 includes CU2 connected to DU3. An IAB node 4 and an IAB node 5 are connected to DU3 through the backhaul links. UE6 is connected to the IAB node 4 through the access link. UE7 is connected to the IAB node 5 through the access link. In FIG. 3(*a*), the donor node 1 and the donor node 2 may further serve as IAB donor base stations. In addition, in the IAB network, a node upstream directly connected to a node may be called as a parent node of the node, and a node downstream directly connected to a node may be called as a child node of the node. For example, the IAB node 2 may be called as a parent node of the IAB node 3, and UE3 and UE4 may be called as the child nodes of the IAB node 3.

As shown in FIG. 3(b), the IAB node 3 connected to the donor node 1 through the IAB node 2 is switched to be connected to the donor node 2 through the IAB node 4. Here, the donor node 1 may be called as a source donor node of the IAB node 3, the IAB node 2 may be called as a source parent node of the IAB node 3, the donor node 2 may be called as a target donor node of the IAB node 3, and the IAB node 4 may be called as a target parent node of the IAB node 3. As shown in FIG. 3(a) and FIG. 3(b), the IAB node 3 is switched between CU (that is, the IAB node 3 is switched from CU1 to CU2). In this case, services for UE3 and UE4 connected to the IAB node 3 may be interrupted.

For such the scenario, an electronic device in a wireless communication system, a wireless communication method performed by an electronic device in a wireless communication system, and a computer-readable storage medium are provided according to the present disclosure, to optimize a switching process in the IAB network, so as to avoid interruption of service for the UE or reduce a time period for which the service for the UE is interrupted.

The wireless communication system according to the present disclosure may be a 5G NR communication system. Further, IAB technology may be applied to the wireless communication system.

The IAB node and the donor node according to the present disclosure each may be a network side device. The network side device may be a base station device deployed by an operator, such as an eNB or a gNB (that is, a base station in the 5th generation communication system).

In addition, the IAB node according to the present disclosure may be an electronic device with some functions of the base station device independent of the base station device. The IAB node may be capable of sending and receiving data, and may be connected to UE through the access link and connected to other IAB nodes or donor nodes through the backhaul link.

Further, the donor node may include a CU and a DU. The IAB node may include a mobile terminal (MT) unit and a DU. The MT is used to connect and communicate with a parent node of the IAB node, and the DU is used to connect and communicate with a child node of the IAB node.

The user equipment according to the present disclosure may be a mobile terminal (such as a smart phone, a tablet personal computer (PC), a notebook PC, a portable game terminal, a portable/dongle mobile router and a digital camera) or a vehicle terminal (such as a car navigation apparatus). The user equipment may be implemented as a terminal (also known as machine type communication (MTC) terminal) that performs machine to machine (M2M) communication. In addition, the user equipment may be a wireless communication module (such as an integrated circuit module including one chip) installed on each of the above terminals.

The embodiment according to the present disclosure may be applied not only to the scenario of high-speed train described above, but also to all scenarios in which the IAB node is switched between donor nodes.

2. Configuration Examples of Electronic Device for Core Network

Figure 4:
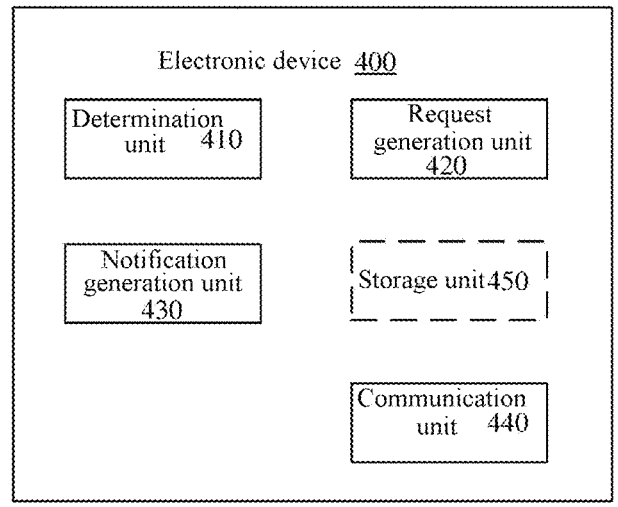
FIG. 4 is a block diagram showing a configuration example of an electronic device for a core network according to an embodiment of the present disclosure.

FIG. 4 is a block diagram showing a configuration example of an electronic device 400 according to an embodiment of the present disclosure. Here, the electronic device 400 may be used for the core network. For example, the electronic device 400 may be a server in the core network.

As shown in FIG. 4, the electronic device 400 may include a determination unit 410, a request generation unit 420, a notification generation unit 430, and a communication unit 440.

Here, each unit of the electronic device 400 may be included in processing circuitry. It should be noted that, the electronic device 400 may include one processing circuitry or multiple processing circuitries. Furthermore, the processing circuitry may include various discrete functional units to perform various different functions and/or operations. It should be noted that these functional units may be physical entities or logical entities, and units with different names may be implemented by a same physical entity.

According to an embodiment of the present disclosure, the determination unit 410 may determine a topological position of an IAB node (for example, the IAB node 3 in FIG. 3(a) and FIG. 3(b)) in an IAB network at a next time instant. The topological position includes a parent node (for example, the IAB node 4 in FIG. 3(a) and FIG. 3(b)) and donor node (for example, the donor node 2 in FIG. 3(a) and FIG. 3(b)) of the IAB node.

According to an embodiment of the present disclosure, the request generation unit 420 may generate a switching request, and the electronic device 400 may send the switching request to the donor node of the IAB node at the next time instant through the communication unit 440, to request that the IAB node is switched at the next time to the parent node and the donor node at the next time instant.

According to an embodiment of the present disclosure, the notification generation unit 430 may generate a switching notification. The switching notification includes the topological position of the IAB node at the next time instant, and the electronic device 400 may send the switching notification to a donor node of the IAB node at a current time instant (for example, the donor node 1 in FIG. 3(a) and FIG. 3(b)) through the communication unit 440, so that the IAB node is connected to both the donor node at the current time instant and the donor node at the next time instant on a control plane.

It can be seen that the electronic device 400 according to the embodiment of the present disclosure may predict the parent node and the donor node of the IAB node, so that the IAB node may be connected to both the source donor node and the target donor node on the control plane. In this way, due to the double connection of the IAB node on the control plane, the service for the UE connected to the IAB node is not interrupted.

In the present disclosure, the donor node of the IAB node at the current time instant is called as a source donor node of the IAB node, the parent node of the IAB node at the current time instant is called as a source parent node of the IAB node, the donor node of the IAB node at the next time instant is called as a target donor node of the IAB node, and the parent node of the IAB node at the next time instant is called as a target parent node of the IAB node.

According to an embodiment of the present disclosure, the determination unit 410 may determine the topological position of the IAB node at the next time instant according to a historical geographical position and a historical topological position of the IAB node. The topological position herein refers to the topological position of the IAB node in the IAB network, and includes the parent node and the donor node of the IAB node.

According to an embodiment of the present disclosure, as shown in FIG. 4, the electronic device 400 may further include a storage unit 450. The storage unit 450 is configured to store a geographical position of each IAB node. The geographical position herein refers to the actual geographical position of the IAB node, such as three-dimensional coordinates of the IAB node. That is, the electronic device 400 may acquire the geographical position of each IAB node in real time and store the geographical position in the storage unit 450 as a historical geographical position.

According to an embodiment of the present disclosure, the electronic device 400 may receive the historical topological position of the IAB node from the donor node at the current time instant of the IAB node through the communication unit 440. Here, each IAB node may periodically send a measurement report to the donor node of the IAB node. The measurement report includes the topological position of the IAB node, and the topological position includes the parent node and the donor node of the IAB node. Therefore, the donor node may determine the topological position of the IAB node according to the measurement report and send the topological position to the electronic device 400 as the historical topological position.

According to an embodiment of the present disclosure, the electronic device 400 may predict the topological position of the IAB node according to the historical geographical position of the IAB node stored in the storage unit 450 and the historical topological position of the IAB node acquired from the donor node. Specifically, the determination unit 410 may determine the geographical position of the IAB node at the next time instant according to the historical geographical position of the IAB node. For example, the determination unit 410 may determine the geographical position of the IAB node at the next time according to a movement speed, a movement trajectory and other parameters of the IAB node. The prediction process is not limited in the present disclosure. Further, the determination unit 410 may determine the topological position of the IAB node at the next time instant according to the geographical position of the IAB node at the next time instant and the historical topological position of the IAB node. That is, the determination unit 410 may determine whether the IAB node is to be switched according to the topological position of the IAB node at the next time instant, including switched between same DUs, switched between same CUs and different DUs, and switched between different CUs (between different donor nodes).

According to an embodiment of the present disclosure, the determination unit 410 may periodically or eventually trigger a determination process to determine the topological position of the IAB node in the IAB network at the next time instant. The next time instant herein may be a future time instant specified by the electronic device 400. For example, in a case that the determination unit 410 periodically triggers the determination process, the next time instant may be a next cycle, that is, the determination unit 410 may determine the topological position of the IAB node in the next cycle.

Further, in a case that the determination unit 410 determines that the donor node of the IAB node changes, the request generation unit 420 may generate the switching request. According to an embodiment of the present disclosure, the switching request generated by the request generation unit 420 may include information of the parent node of the IAB node at the next time instant. Here, the donor node at the next time instant may send the switching request to the parent node at the next time instant to determine whether the parent node at the next time instant allows the IAB node to be connected.

According to an embodiment of the present disclosure, after the donor node at the next time instant receives, from the parent node at the next time instant, a switching response indicating that the IAB node is allowed to be connected, the electronic device 400 may receive a switching response from the donor node at the next time instant through the communication unit 440, to determine that the IAB node is allowed, at the next time instant, to be switched to the parent node and the donor node at the next time instant.

According to an embodiment of the present disclosure, after the electronic device 400 receives the switching response from the donor node at the next time instant, the notification generation unit 430 may generate a switching notification including the donor node at the next time instant and the parent node at the next time instant, and send the switching notification to the donor node at the current time instant.

According to an embodiment of the present disclosure, the electronic device 400 may perform the above operations for any IAB node. That is, in a case that the donor node of any IAB node changes, the electronic device 400 may send the switching request to the donor node of the IAB node at the next time instant and send the switching notification to the donor node of the IAB node at the current time instant.

Figure 5:
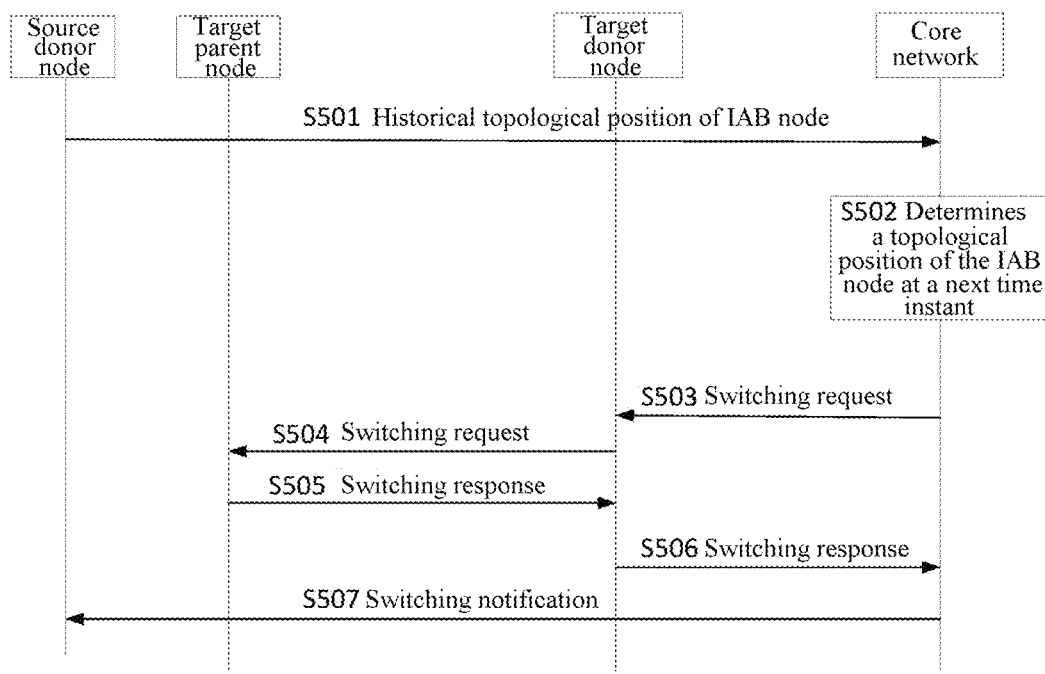
FIG. 5 is a signaling flow chart showing that an electronic device for a core network assists an IAB node in performing a switching process according to an embodiment of the present disclosure.

FIG. 5 is a signaling flow chart showing that an electronic device for a core network assists an IAB node in performing a switching process according to an embodiment of the present disclosure. As shown in FIG. 5, in step S501, a source donor node periodically sends a historical topological position of an IAB node connected to the source donor node to a core network. Next, in step S502, the core network determines a topological position of the IAB node at a next time instant according to the historical topological position and a historical geographic position of the IAB node. Next, in a case that a donor node of the IAB node changes, in step S503, the core network sends a switching request including information of a target parent node, to a target donor node, to request the IAB node to be connected to the target parent node and the target donor node. Next, in step S504, the target donor node sends a switching request to the target parent node. Next, in step S505, the target parent node sends, to the target donor node, a switching response indicating that the IAB node is allowed to be connected. Next, in step S506, the target donor node sends, to the core network, a switching response indicating that the target donor node and the target parent node allow the IAB node to be connected. Next, in step S507, the core network sends, to the source donor node, a switching notification including the target donor node and the target parent node, so that the IAB node may be connected to the target donor node and the source donor node on the control plane.

It can be seen that according to the embodiments of the present disclosure, in a case that the electronic device 400 determines that the donor node of the IAB node changes, the electronic device 400 may inform the target donor node and the target parent node in advance that the IAB node is to be switched, and may send information of the target donor node and the target parent node to the source donor node, so as to prepare for the double connection of the IAB node on the control plane.

3. Configuration Examples of Electronic Device for IAB Donor Node

Figure 6:
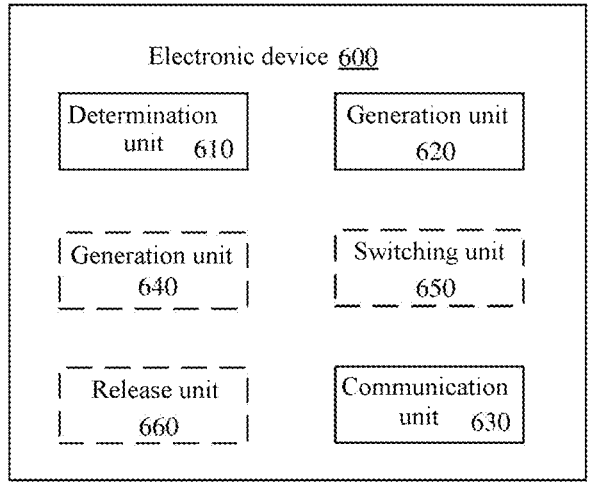
FIG. 6 is a block diagram showing a configuration example of an electronic device for an IAB donor node according to an embodiment of the present disclosure.

FIG. 6 is a block diagram showing a configuration example of an electronic device 600 according to an embodiment of the present disclosure. Here, the electronic device 600 may be used for the IAB donor node. For example, the IAB donor node may be a network side device.

As shown in FIG. 6, the electronic device 600 may include a determination unit 610, a generation unit 620, and a communication unit 630.

Here, each unit of the electronic device 600 may be included in processing circuitry. It should be noted that, the electronic device 600 may include one processing circuitry or multiple processing circuitries. Furthermore, the processing circuitry may include various discrete functional units to perform various different functions and/or operations. It should be noted that these functional units may be physical entities or logical entities, and units with different names may be implemented by a same physical entity.

According to an embodiment of the present disclosure, the electronic device 600 may receive a switching notification through the communication unit 630. The switching notification includes information of the IAB node and a topological position of the IAB node in an IAB network at a next time instant. The topological position includes a parent node and a donor node of the IAB node.

According to an embodiment of the present disclosure, the determination unit 610 may determine the parent node and the donor node of the IAB node connected to the electronic device 600 at the next time instant according to the switching notification.

According to an embodiment of the present disclosure, the generation unit 640 may generate a switching notification. The switching notification may include the topological position of the IAB node at the next time instant, and the topological position includes the parent node and the donor node of the IAB node. Further, the electronic device 600 may send the switching notification to the IAB node through the communication unit 630, so that the IAB node is connected to both the electronic device 600 and the donor node at the next time on a control plane.

It can be seen that the electronic device 600 according to the embodiments of the present disclosure may send the switching notification including the parent node and the donor node of the IAB node at the next time instant to the IAB node, so that the IAB node is connected to both the electronic device 600 and the donor node at the next time instant on the control plane. In this way, due to the double connection of the IAB node on the control plane, service for the UE connected to the IAB node is not interrupted.

According to an embodiment of the present disclosure, the electronic device 600 may be the donor node of the IAB node. That is, the IAB node is directly connected to the electronic device 600 or indirectly connected to the electronic device 600 through one or more other IAB nodes. Further, the electronic device 600 may receive the switching notification from the network side device in the core network.

According to an embodiment of the present disclosure, as shown in FIG. 6, the electronic device 600 may further include a generation unit 640. The generation unit 640 is configured to generate a topological position of the IAB node. For example, the electronic device 600 may determine the topological position of the IAB node based on a measurement report received from the IAB node. Further, the electronic device 600 may send the topological position of the IAB node to the network side device in the core network through the communication unit 630 for the network side device to determine the topological position of the IAB node at the next time instant. Here, since the topological position of the IAB node sent by the electronic device 600 to the network side device includes a topological position of the IAB node at a previous time instant, the topological position is also referred to as a historical topological position of the IAB node.

According to an embodiment of the present disclosure, the electronic device 600 may periodically acquire the measurement report from the IAB node, to determine the topological position of the IAB node. Further, the electronic device 600 may periodically send the historical topological position of the IAB node to the network side device in the core network.

According to an embodiment of the present disclosure, the electronic device 600 may receive the switching notification from the network side device in the core network through an RRC reconfiguration message, and may send the switching notification to the IAB node through the RRC reconfiguration message.

According to an embodiment of the present disclosure, as shown in FIG. 6, the electronic device 600 may further include a switching unit 630. The switching unit 630 is configured to, in response to a switching success message from the donor node at the next time instant, switch the IAB node from the electronic device 600 to the donor node at the next time instant on a user plane. Here, the electronic device 600 receives, from a target donor node, the switching success message indicating that the IAB node is successfully connected to the target parent node and the target donor node. In this case, the switching unit 630 may switch the IAB node from the electronic device 600 to the target donor node on the user plane.

As described above, according to the embodiments of the present disclosure, in a case that the donor node of the IAB node changes, the IAB node may be connected to the both electronic device 600 as the source donor node and the target donor node on the control plane. In addition, before the IAB node is connected to the target parent node and the target donor node, the IAB node is connected to the source donor node on the user plane, while the IAB node is connected to the target donor node on the user plane after the IAB node is connected to the target parent node and the target donor node. That is, the IAB node maintains a single connection on the user plane and only achieves a double connection on the control plane, thereby reducing a switching time period.

According to an embodiment of the present disclosure, as shown in FIG. 6, the electronic device 600 may further include a release unit 660. The release unit 660 is configured to, in response to a release message from the donor node at the next time instant, release connection with the IAB node on the control plane. Therefore, the IAB node is only connected to the target donor node on both the user plane and the control plane.

Figure 7:
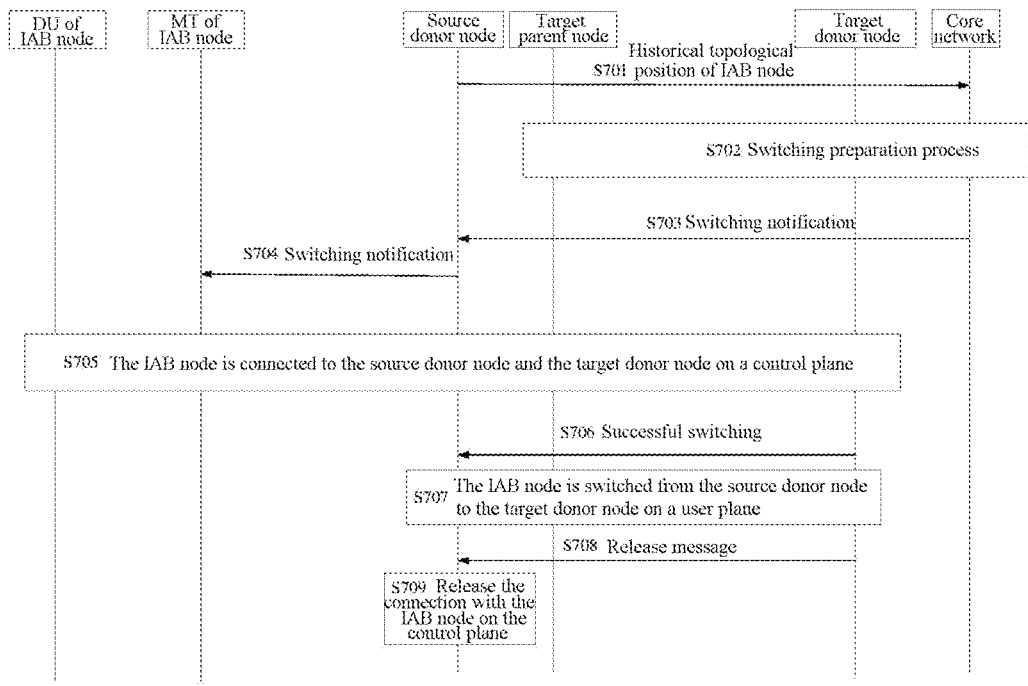
FIG. 7 is a signaling flow chart showing that an electronic device for an IAB donor node assists an IAB node in performing a switching process according to an embodiment of the present disclosure.

FIG. 7 is a signaling flow chart showing that an electronic device for an IAB donor node assists an IAB node in performing a switching process according to an embodiment of the present disclosure. In FIG. 7, a source donor node may be implemented by the electronic device 600. In addition, a DU and a MT unit of the to-be-switched IAB node are shown in FIG. 7. In step S701, the source donor node sends a historical topological position of the IAB node to a core network. Next, in step S702, the core network, a target donor node and a target parent node perform a switching preparation process, including, for example, steps S502 to S506 in FIG. 5. Next, in step S703, the core network sends to the source donor node, a switching notification including information of the to-be-switched IAB node and information of the target parent node and the target donor node. Next, in step S704, the source donor node sends a switching notification including the target parent node and the target donor node to the IAB node. Specifically, the source donor node sends the switching notification to the MT of the IAB node. Next, in step S705, the IAB node is connected to both the source donor node and the target donor node on the control plane. Next, in step S706, the source donor node receives a switching success message from the target donor node, and the switching success message indicates that the IAB node is successfully connected to the target parent node and the target donor node. Next, in step S707, the source donor node switches the IAB node from the source donor node to the target donor node on the user plane. Next, in step S708, the target donor node sends a release message to the source donor node. Next, in step S709, the source donor node releases the connection with the IAB node on the control plane.

It can be seen that according to the embodiments of the present disclosure, the electronic device 600 may send the switching notification including the parent node and the donor node of the IAB node at the next time instant to the IAB node, so that the IAB node is connected to both the electronic device 600 and the donor node at the next time instant on the control plane. In addition, after the IAB node is successfully connected to the target parent node and the target donor node, the electronic device 600 may switch the IAB node from the electronic device 600 to the target donor node on the user plane and release the connection with the IAB node on the control plane. In summary, the service for the user equipment connected to the IAB node cannot be interrupted and the switching time period can be reduced.

4. Configuration Examples of Electronic Device for IAB Node

Figure 8:
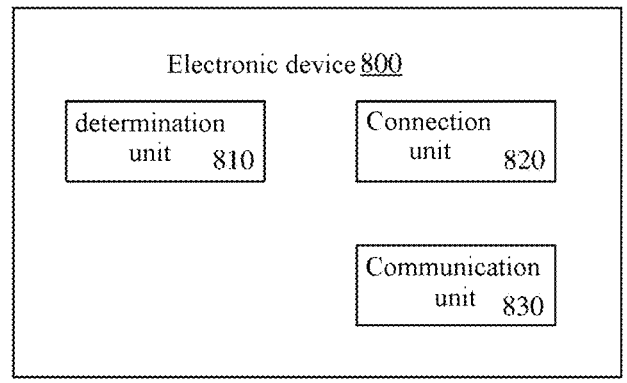
FIG. 8 is a block diagram showing a configuration example of an electronic device for an IAB node according to an embodiment of the present disclosure.

FIG. 8 is a block diagram showing a configuration example of an electronic device 800 according to an embodiment of the present disclosure. Here, the electronic device 800 may be used for the IAB node. For example, the IAB node may be a network side device, such as a base station device, or an electronic device with some functions (including receiving and transmitting data) of the base station device.

As shown in FIG. 8, the electronic device 800 may include a determination unit 810, a connection unit 820, and a communication unit 830.

Here, each unit of the electronic device 800 may be included in processing circuitry. It should be noted that, the electronic device 800 may include one processing circuitry or multiple processing circuitries. Furthermore, the processing circuitry may include various discrete functional units to perform various different functions and/or operations. It should be noted that these functional units may be physical entities or logical entities, and units with different names may be implemented by a same physical entity.

According to an embodiment of the present disclosure, the electronic device 800 may receive a switching notification from a donor node of the electronic device 800 at a current time instant through the communication unit 830. The switching notification includes a topological position of the electronic device 800 in an IAB network at a next time instant. The topological position includes a parent node and a donor node of the electronic device 800.

According to an embodiment of the present disclosure, the determination unit 810 may determine a parent node and a donor node of the electronic device 800 at the next time instant according to the switching notification.

According to an embodiment of the present disclosure, the connection unit 820 may connect to the donor node at the next time instant on a control plane, and connect to the donor node at the current time instant on the control plane.

According to an embodiment of the present disclosure, the connection unit 820 may perform a random access process to connect a MT unit in the electronic device 800 to the parent node at the next time instant. Specifically, the connection unit 820 may perform the random access process to connect to the parent node at the next time instant. Further, the electronic device 800 may send an RRC configuration completion message to the parent node at the next time instant, so that the parent node at the next time instant forwards the RRC configuration completion message to the donor node at the next time instant. In this way, the MT unit in the electronic device 800 is connected to the donor node at the next time instant.

According to an embodiment of the present disclosure, the connection unit 820 may connect a DU in the electronic device 800 to the donor node at the next time instant on the control plane.

According to an embodiment of the present disclosure, when the connection unit 820 connects the electronic device 800 to the parent node and the donor node at the next time instant, the electronic device 800 may send a configuration update message of the electronic device 800 to the donor node at the next time instant through the communication unit 830.

According to an embodiment of the present disclosure, the electronic device 800 may periodically send a measurement report to the donor node at the current time instant via all IAB nodes between the electronic device 800 and the donor node at the current time instant through the communication unit 830 for the donor node at the current time instant to determine the topological position of the electronic device 800 according to the measurement report.

It can be seen that the electronic device 800 according to the embodiments of the present disclosure may be connected to both the source donor node and the target donor node on the control plane. In this way, due to the double connection of the electronic device 800 on the control plane, the service for the UE connected to the electronic device 800 is not interrupted.

Figure 9:
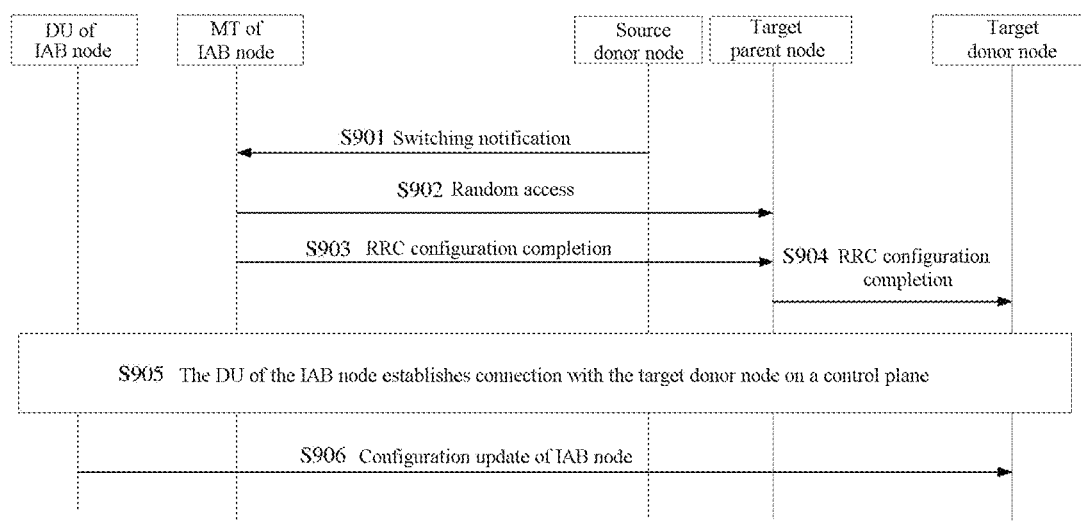
FIG. 9 is a signaling flow chart showing that an electronic device for an IAB node performs a switching process according to an embodiment of the present disclosure.

FIG. 9 is a signaling flow chart showing that an electronic device for an IAB node performs a switching process according to an embodiment of the present disclosure. In FIG. 9, the IAB node may be implemented by the electronic device 800. The DU and the MT unit of the IAB node are shown in FIG. 9. In step S901, the DU of the IAB node receives, from the source donor node, a switching notification including a target parent node and a target donor node of the IAB node. Next, in step S902, the MT unit of the IAB node performs a random access process to connect to the target parent node. Next, in step S903, the MT unit of the IAB node sends an RRC configuration completion message to the target parent node. Next, in step S904, the target parent node forwards the RRC configuration completion message to the target donor node. In this way, the MT unit of the IAB node is connected to the target parent node. Next, in step S905, the DU of the IAB node establishes connection with the target donor node on a control plane. Next, in step S906, the DU of the IAB node sends a configuration update message of the IAB node to the target donor node. In this way, the IAB node is connected to the source donor node and the target donor node on the control plane.

As described above, the electronic device 400 for the core network, the electronic device 600 for the source donor node and the electronic device 800 for the IAB node according to the embodiments of the present disclosure are described respectively. A process of an IAB node switched to a donor node according to the embodiment of the present disclosure is described below with reference to FIG. 10.

Figure 10:
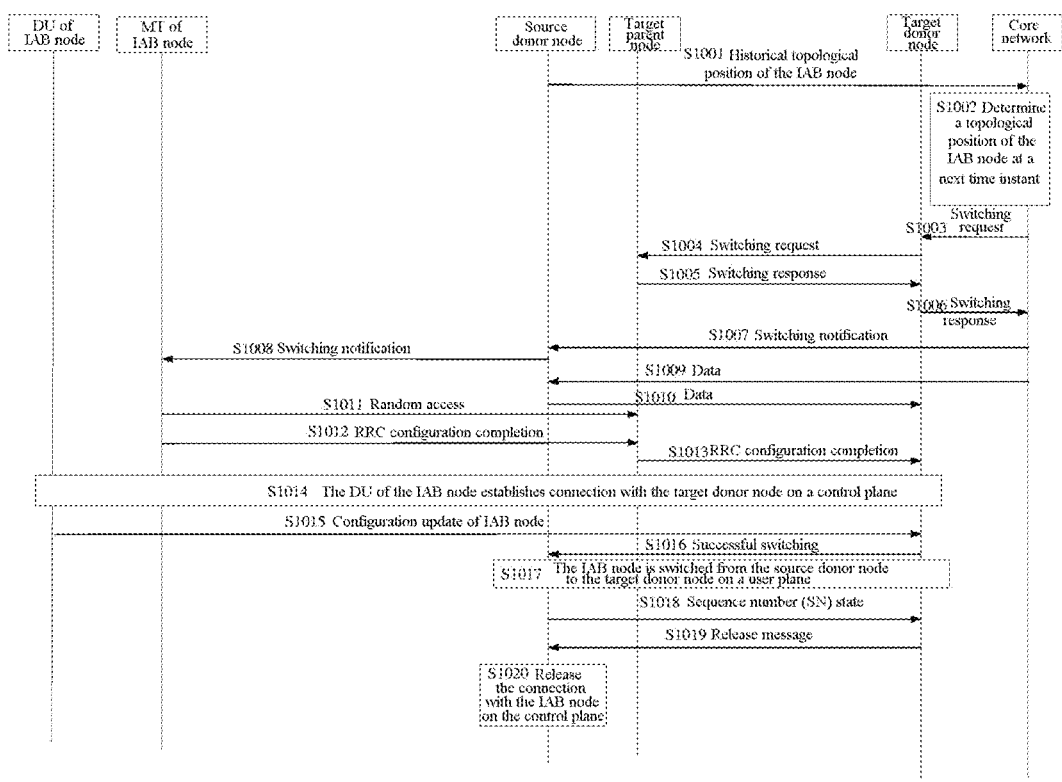
FIG. 10 is a signaling flow chart showing a process of an IAB node switched to a donor node according to an embodiment of the present disclosure.
Figure 11A:
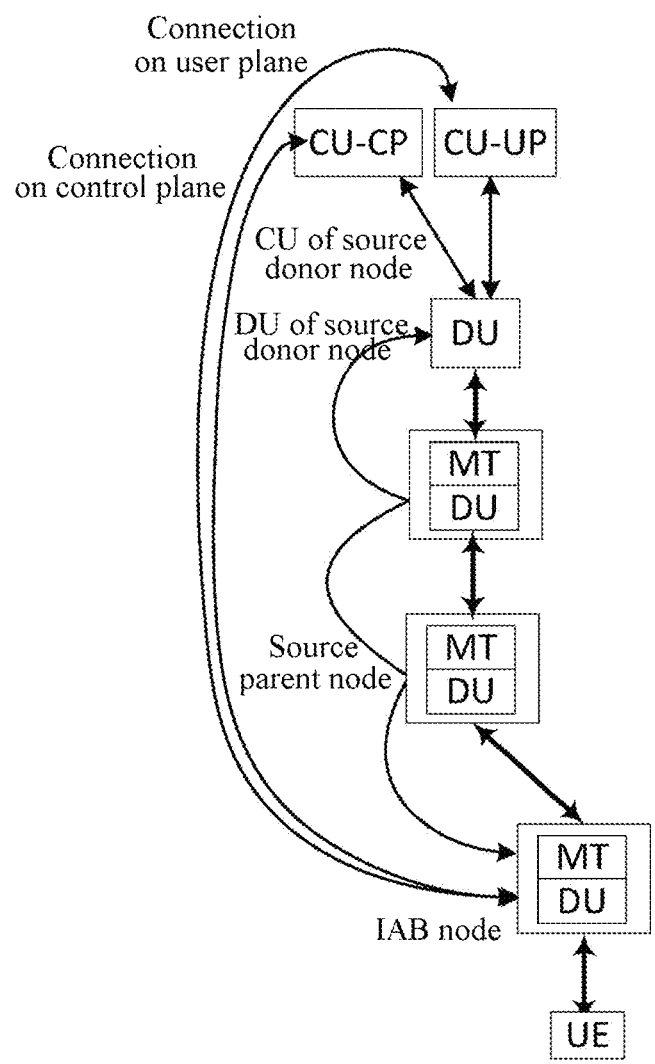
FIG. 11(*a*) to FIG. 11(*d*) are schematic diagrams showing a connection relationship between an IAB node on a user plane and a control plane in different phases of a process of an TAB node switched to a donor node according to an embodiment of the present disclosure.
Figure 11B:
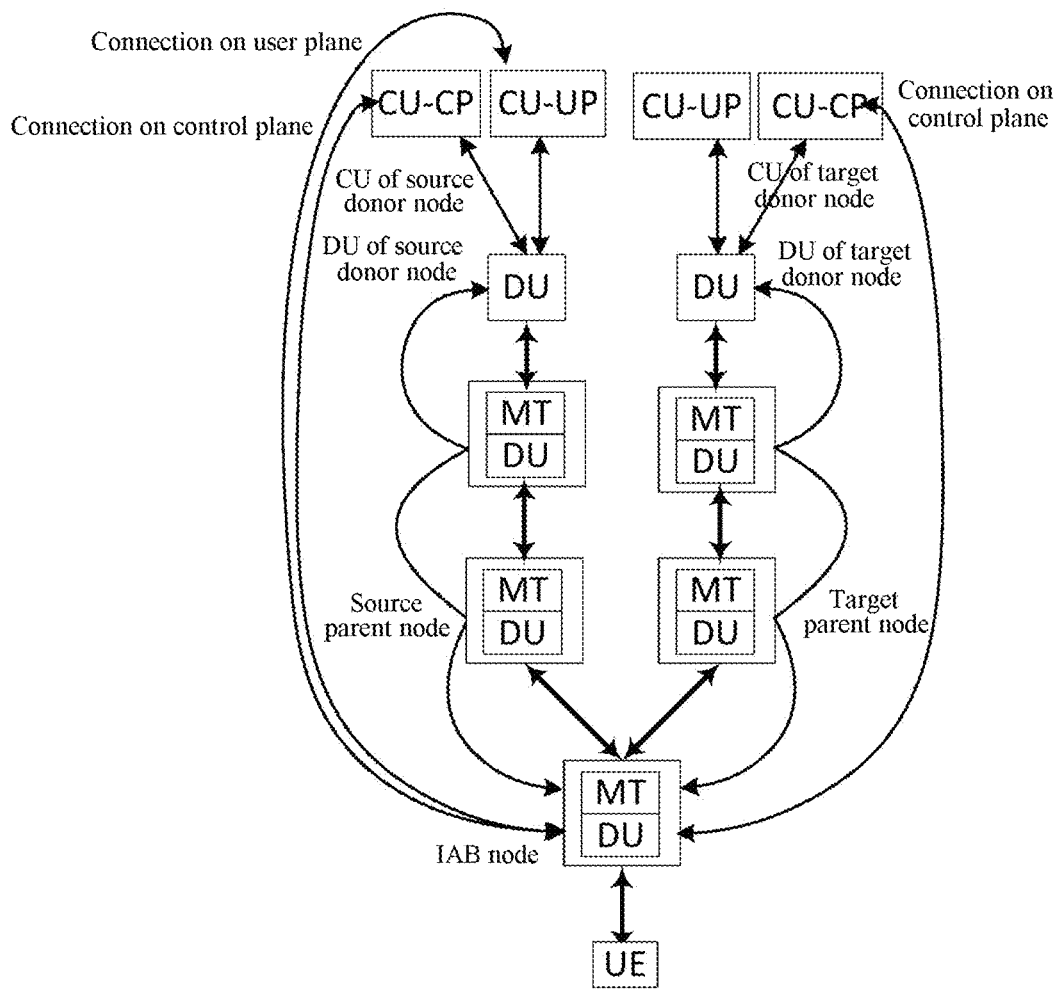
Figure 11C:
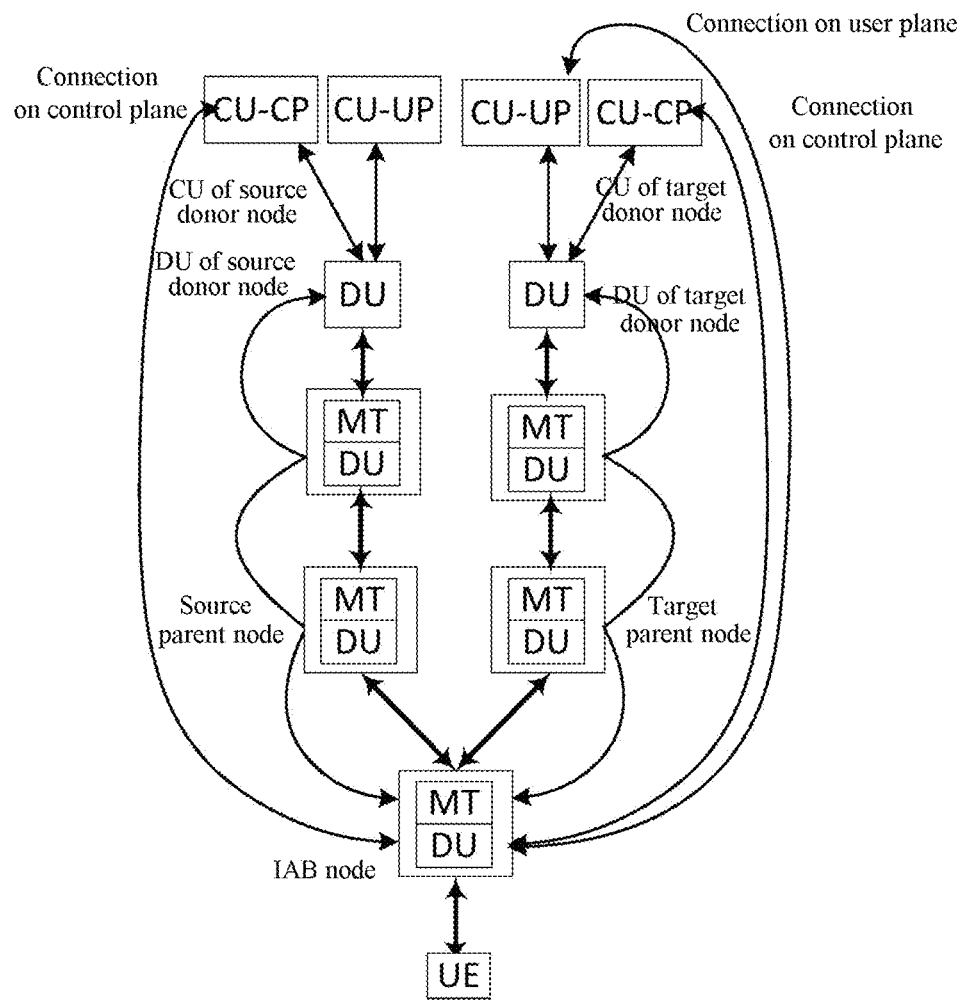
Figure 11D:
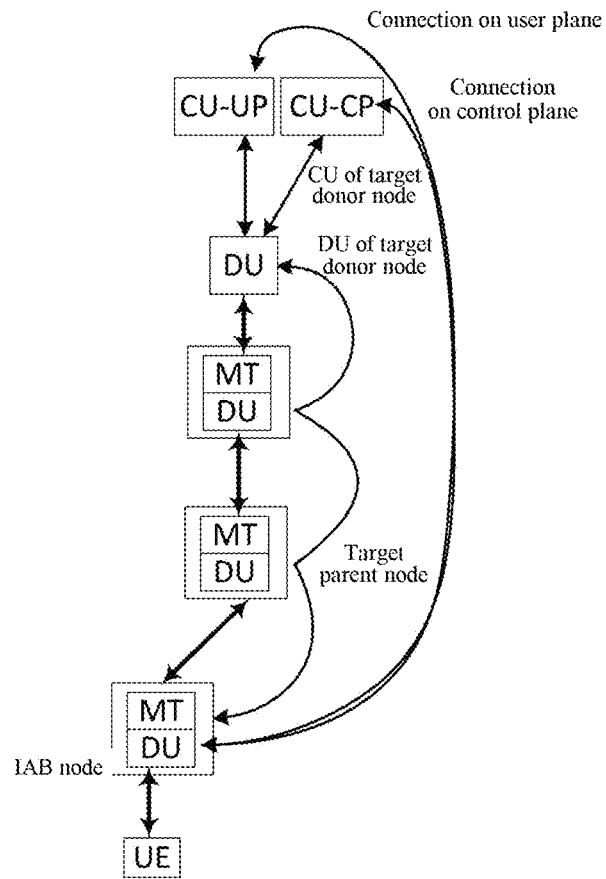

FIG. 10 is a signaling flow chart showing a process of an IAB node switched to a donor node according to an embodiment of the present disclosure. In FIG. 10, the electronic device 400 may be used for the core network, the source donor node may be implemented by the electronic device 600, and the IAB node may be implemented by the electronic device 800. As shown in FIG. 10, in step S1001, the source donor node periodically sends, to the core network, a historical topological position of the IAB node connected to the source donor node. Next, in step S1002, the core network determines a topological position of the IAB node at a next time instant according to the historical topological position and a historical geographic position of the IAB node. Next, when the donor node of the IAB node changes, in step S1003, the core network sends, to the target donor node, a switching request including information of the target parent node to request the IAB node to be connected to the target parent node and the target donor node. Next, in step S1004, the target donor node sends the switching request to the target parent node. Next, in step S1005, the target parent node sends, to the target donor node, a switching response, indicating that the IAB node is allowed to be connected. Next, in step S1006, the target donor node sends, to the core network, a switching response indicating that the target donor node and the target parent node allow the IAB node to be connected. Next, in step S1007, the core network sends, to the source donor node, a switching notification including the target donor node and the target parent node. Next, in step S1008, the source donor node sends the switching notification including the target parent node and the target donor node to the IAB node. Specifically, the source donor node sends the switching notification to the MT of the IAB node. Next, alternatively, in step S1009, the core network sends data to the source donor node. Next, in step S1010, the source donor node forwards the data received from the core network to the target donor node, to ensure continuity of the service. Next, in step S1011, the MT of the IAB node performs a random access process to connect to the target parent node. Next, in step S1012, the MT of the IAB node sends an RRC configuration completion message to the target parent node. Next, in step S1013, the target parent node forwards the RRC configuration completion message to the target donor node. Next, in step S1014, the DU of the IAB node is connected to the target donor node on a control plane. Next, in step S1015, the DU of the IAB node sends a configuration update of the IAB node to the target donor node. Next, in step S1016, the source donor node receives, from the target donor node, a switching success message indicating that the IAB node is successfully connected to the target parent node and the target donor node. Next, in step S1017, the source donor node switches the IAB node from the source donor node to the target donor node on a user plane. Next, in step S1018, the source donor node sends sequence number (SN) state information to the target donor node. Next, in step S1019, the target donor node sends a release message to the source donor node. Next, in step S1020, the source donor node releases the connection with the IAB node on the control plane.

FIG. 11(*a*) to FIG. 11(*d*) are schematic diagrams showing a connection relationship between an IAB node on a user plane and a control plane in different phases of a process of an IAB node switched to a donor node according to an embodiment of the present disclosure.

In FIG. 11(*a*), the UE is connected to the DU of the source donor node via three IAB nodes, and each of the IAB nodes includes an MT unit and a DU. The IAB node directly connected to the UE represents an IAB node to be switched to another donor node, and an IAB node directly connected to the IAB node is a source parent node. The DU of the source donor node is connected to a CU of the source donor node. CU-CP (control plane) represents a control surface of the CU, and CU-UP (user plane) represents a user surface of the CU. As shown in FIG. 11(*a*), the IAB node is connected to the CU of the source donor node on both the user plane and the control plane.

FIG. 11(*b*) shows a case where the IAB node performs double connection on the control plane. That is, after step S1015 in FIG. 10 is performed, a connection relationship between the IAB node on the user plane and the control plane is shown in FIG. 11(*b*). In FIG. 11(*b*), the IAB node is connected to both the CU of the source donor node on the control plane and the CU of the target donor node. The IAB node is connected to the CU of the source donor node on the user plane. In addition, the IAB node is still connected to the CU of the source donor node on the user plane.

FIG. 11(*c*) shows a case where the IAB node is switched from the source donor node to the target donor node on the user plane after the IAB node is connected to the target donor node. That is, after step S1017 in FIG. 10 is performed, a connection relationship between the IAB node on the user plane and the control plane is shown in FIG. 11(*c*). In FIG. 11(*c*), the IAB node is connected to both the CU of the source donor node and the CU of the target donor node on the control plane. The IAB node is connected to the CU of the target donor node on the user plane.

FIG. 11(*d*) shows a case after the source donor node releases the connection with the IAB node on the control plane after the switching of the IAB node is completed. That is, after step S1020 in FIG. 10 is performed, a connection relationship of the IAB node on the user plane and the control plane is shown in FIG. 11(*d*). In FIG. 11(*d*), the IAB node is connected to the CU of the target donor node on the control plane, and the IAB node is connected to the CU of the target donor node on the user plane.

It can be seen that according to the embodiments of the present disclosure, the core network may predict the target parent node and the target donor node of the IAB node, and trigger a switching process when the donor node of the IAB node changes, so that the IAB node may be both connected to the source donor node and the target donor node on the control plane. Further, at an appropriate time, the IAB node is switched to be connected from the source donor node to the target donor node on the user plane. In this way, due to the double connection of the electronic device 800 on the control plane, the service for the UE connected to the electronic device 800 is not interrupted. In addition, since the double connection is achieve only on the control plane and the single connection is still on the user plane, the switching time period can be reduced. In summary, according to the embodiments of the present disclosure, the service for the UE is not interrupted and the switching speed can be improved.

5. Configuration Examples of User Equipment

Figure 12:
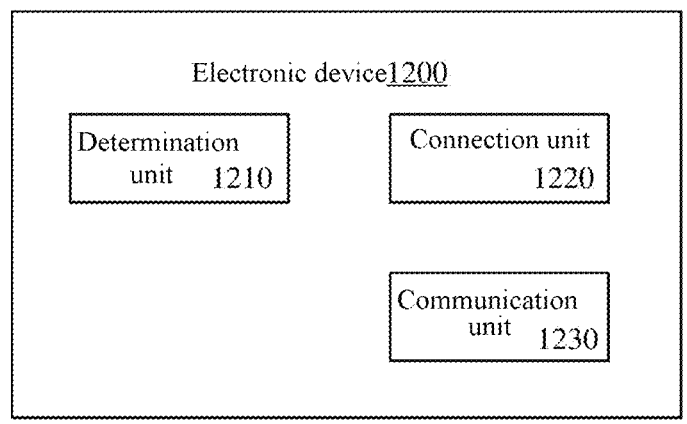
FIG. 12 is a block diagram showing a configuration example of an electronic device for a user equipment according to an embodiment of the present disclosure.

FIG. 12 is a block diagram showing a configuration example of an electronic device 1200 for a user equipment in a wireless communication system according to an embodiment of the present disclosure.

As shown in FIG. 12, the electronic device 1200 may include a determination unit 1210, a connection unit 1220, and a communication unit 1230.

Here, each unit of the electronic device 1200 may be included in processing circuitry. It should be noted that, the electronic device 1200 may include one processing circuitry or multiple processing circuitries. Furthermore, the processing circuitry may include various discrete functional units to perform various different functions and/or operations. It should be noted that these functional units may be physical entities or logical entities, and units with different names may be implemented by a same physical entity.

According to an embodiment of the present disclosure, the electronic device 1200 may receive a switching notification from an IAB node connected to the electronic device 1200 through the communication unit 1230. The switching notification includes a parent node of the IAB node in an IAB network at a next time instant.

According to an embodiment of the present disclosure, the determination unit 1210 may determine the parent node of the IAB node at the next time instant according to the switching notification, so as to determine that the IAB node is to be switched.

According to an embodiment of the present disclosure, the connection unit 1220 may establish connection with the parent node in the switching notification.

According to an embodiment of the present disclosure, after the IAB node is switched to the parent node, the connection unit 1220 may re-establish connection with the IAB node.

As described above, the electronic device 1200 according to the embodiments of the present disclosure may be temporarily connected to a target parent node of the IAB node during the switching process of the IAB node connected to the electronic device 1200, so as to reduce the time period for which the service for the UE is interrupted. This is because the electronic device 1200 is close to the IAB node connected to the electronic device 1200. Especially in a scenario of the high-speed train, the electronic device 1200 may be regarded as a whole with an access device as the IAB node. Therefore, the target parent node of the IAB node may be an optimal node of the electronic device 1200. In this way, a signaling overhead in the switching process can be reduced, thereby achieving a more rapid switching.

According to an embodiment of the present disclosure, the electronic device 1200 may receive the switching notification from the IAB node through an RRC reconfiguration message. Here, the IAB node may determine the target parent node of the IAB node according to the switching notification (that is, the RRC reconfiguration message) from a source parent node, and determine whether the target parent node does not belong to the source donor node. In a case that the target parent node of the IAB node does not belong to the source donor node, that is, the IAB node is to be switched between the donor nodes, the IAB node may send a switching notification including the target parent node to the electronic device 1200. Further, the switching may be triggered by the source donor node according to a measurement report from the IAB node (that is, the conventional method for triggering switching), or triggered by the core network according to a predicted parent node and a predicted donor node at the next time instant (that is, the method for triggering switching described above).

According to an embodiment of the present disclosure, the connection unit 1220 may perform a random access process to establish connection with the parent node in the switching notification.

According to an embodiment of the present disclosure, the connection unit 1220 may perform, after the IAB node is switched to the parent node, a random access process to re-establish connection with the IAB node. Here, the electronic device 1200 may determine a time instant when the IAB node is switched to the parent node. For example, if the IAB node fails to be switched to the parent node, the IAB node is disconnected from the network, and thus the electronic device 1200 cannot detect the IAB node. Therefore, in a case that the electronic device 1200 may detect the IAB node, the electronic device 1200 may determine that the IAB node is switched to the parent node, so that the connection with the IAB node may be re-established.

Figure 13:
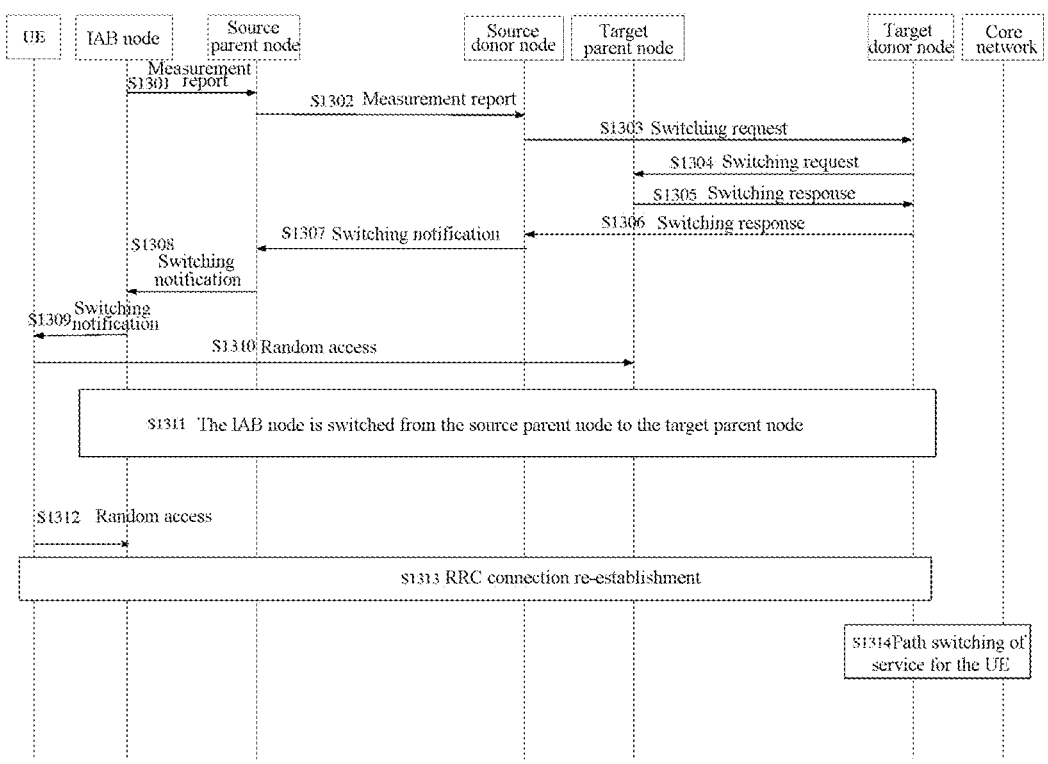
FIG. 13 is a signaling flow chart showing a process of an IAB node switched to a donor node according to another embodiment of the present disclosure.

FIG. 13 is a signaling flow chart showing a process of an IAB node switched to a donor node according to another embodiment of the present disclosure. In FIG. 13, the UE may be implemented by the electronic device 1200. As shown in FIG. 13, in step S1301, the IAB node periodically sends a measurement report to the source parent node. Next, in step S1302, the source parent node forwards the measurement report of the IAB node to the source donor node. Next, in step S1303, the source donor node determines that the IAB node is required to perform a switching process according to the measurement report, so as to send a switching request to the target donor node. Next, in step S1304, the target donor node sends a switching request to the target parent node to request that the IAB node is connected to the target parent node. Next, in step S1305, the target parent node sends, to the target donor node, a switching response indicating that the IAB node is allowed to be connected. Next, in step S1306, the target donor node sends a switching response to the source donor node to indicate that the target donor node and the target parent node allow the IAB node to be connected. Next, in step S1307, the source donor node sends, to the source parent node, a switching notification including the target parent node of the IAB node. Next, in step S1308, the source parent node forwards the switching notification to the IAB node. Next, in step S1309, the IAB node sends, to the UE, a switching notification including the target parent node of the IAB node. Next, in step S1310, the UE performs a random access process to be connected to the target parent node. Next, in step S1311, after the UE is connected to the target parent node, the IAB node performs a switching process to be switched to the target parent node and the target donor node. Next, in step S1312, the UE determines that the switching of the IAB node is completed, thereby performing a random access process to reconnect to the IAB node. Next, in step S1313, the UE performs a RRC connection re-establishment process. Next, in step S1314, the target donor node sends a path switching of service for the UE to the core network. It is noted that FIG. 13 shows an example of a switching process triggered by a source donor node. According to the embodiment of the present disclosure, the core network may trigger the switching process by predicting the target parent node and the target donor node of the IAB node.

Figure 14A:
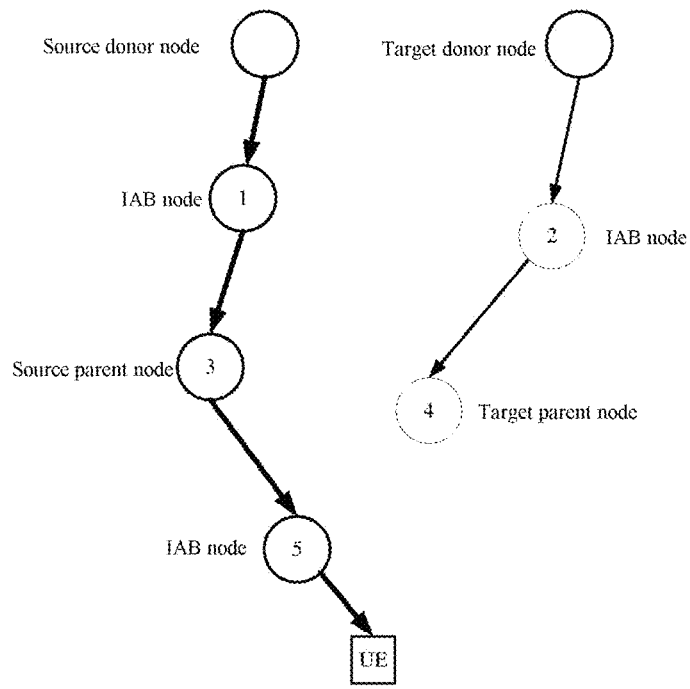
FIGS. 14(*a*) to 14(*c*) are schematic diagrams showing topological positions of a IAB node and a user equipment connected with the IAB node in different phases of a process of an IAB node switched to a donor node according to an embodiment of the present disclosure.
Figure 14B:
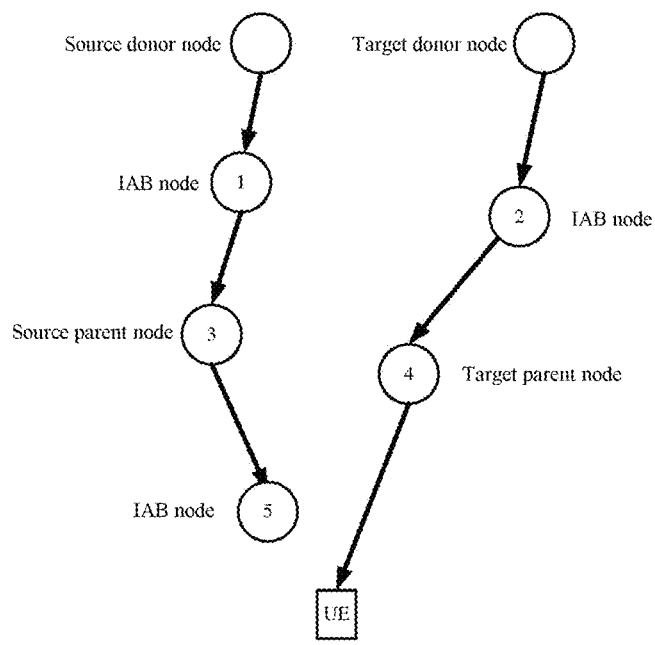
Figure 14C:
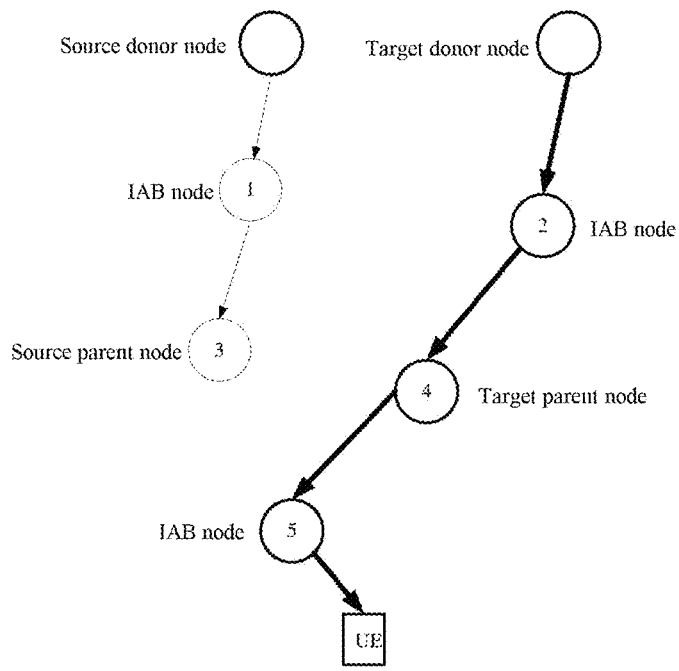

FIGS. 14(a) to 14(c) are schematic diagrams showing topological positions of a IAB node and a user equipment connected with the IAB node in different phases of a process of an IAB node switched to a donor node according to an embodiment of the present disclosure. In FIGS. 14(a) to 14(c), the UE may be implemented by the electronic device 1200.

As shown in FIG. 14(a), the UE is connected to a source donor node through an IAB node 5, an IAB node 3 and an IAB node 1. An IAB node 4 is connected to a target donor node through the IAB node 2. A source parent node of the IAB node 5 is the IAB node 3. A target parent node is the IAB node 4.

As shown in FIG. 14(b), the UE is switched from the IAB node 5 to the IAB node 4 before the IAB node 5 is switched from the IAB node 3 to the IAB node 4. That is, before the IAB node is switched to the target parent node, the UE connected to the IAB node is switched to the target parent node. That is, after step S1310 in FIG. 13 is performed, a topological structure of the IAB network is changed to that in FIG. 14(b).

As shown in FIG. 14(c), after the IAB node 5 is switched to the IAB node 4, the UE is reconnected to the IAB node 5. That is, after switching of the IAB node is completed, the UE connected to the parent node of the IAB node is reconnected to the IAB node. That is, after step S1314 in FIG. 13 is performed, a topological structure of the IAB network is changed to that in FIG. 14(c).

As described above, the electronic device 1200 according to the embodiments of the present disclosure may be temporarily connected to the target parent node of the IAB node during the switching process of the IAB node connected to the electronic device 1200, so as to reduce the time period for which the service for the UE is interrupted. In this way, the signaling overhead in the switching process can be reduced, achieving a more rapid switching.

6. Method Embodiments

Next, a wireless communication method performed by the electronic device 400 for a core network in a wireless communication system according to embodiments of the present disclosure is described in detail.

Figure 15:
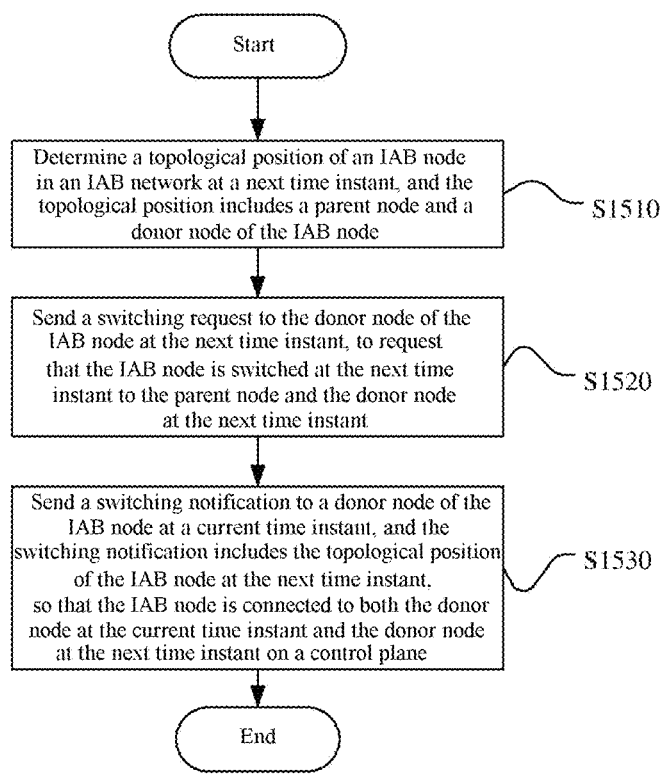
FIG. 15 is a flow chart showing a wireless communication method performed by an electronic device for a core network according to an embodiment of the present disclosure.

FIG. 15 is a flow chart showing a wireless communication method performed by an electronic device 400 for a core network in a wireless communication system according to an embodiment of the present disclosure.

As shown in FIG. 15, in step S1510, a topological position of an IAB node in an IAB network at a next time instant is determined, and the topological position includes a parent node and a donor node of the IAB node.

Next, in step S1520, a switching request is sent to the donor node of the IAB node at the next time instant, to request that the IAB node is switched at the next time instant to the parent node and the donor node at the next time instant.

Next, in step S1530, a switching notification is sent to a donor node of the IAB node at a current time instant. The switching notification includes the topological position of the IAB node at the next time instant, so that the IAB node is connected to both the donor node at the current time instant and the donor node at the next time instant on a control plane.

In an embodiment, the determining the topological position of the IAB node at the next time instant includes determining the topological position of the IAB node at the next time instant according to a historical geographical position and a historical topological position of the IAB node.

In an embodiment, the determining the topological position of the IAB node at the next time instant includes determining a geographical position of the IAB node at the next time instant based on the historical geographical position of the IAB node; and determining the topological position of the IAB node at the next time instant according to the geographical position of the IAB node at the next time instant and the historical topological position of the IAB node.

In an embodiment, the wireless communication method further includes receiving the historical topological position of the IAB node from the donor node at the current time instant.

In an embodiment, the wireless communication method further includes receiving a switching response from the donor node at the next time instant, to determine that the IAB node is allowed, at the next time instant, to be switched to the parent node and the donor node at the next time instant.

According to the embodiments of the present disclosure, the above method may be performed by the electronic device 400 according to the embodiments of the present disclosure, and thus all the embodiments of the electronic device 400 described above are applicable to this.

Next, a wireless communication method performed by the electronic device 600 for an IAB donor node in a wireless communication system according to an embodiment of the present disclosure is described in detail.

Figure 16:
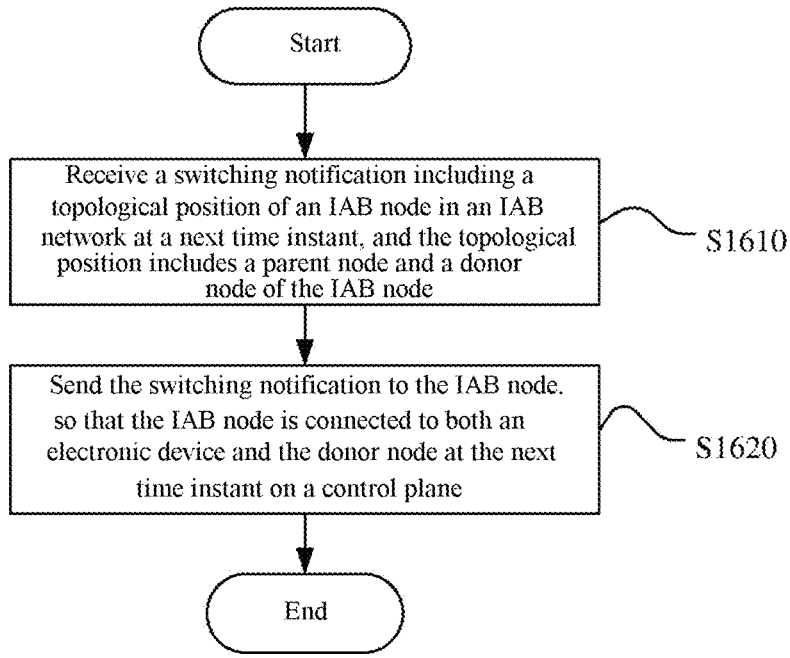
FIG. 16 is a flow chart showing a wireless communication method performed by an electronic device for an IAB donor node according to an embodiment of the present disclosure.

FIG. 16 is a flow chart showing a wireless communication method performed by an electronic device 600 for an IAB donor node according to an embodiment of the present disclosure.

As shown in FIG. 16, in step S1610, a switching notification including a topological position of an IAB node in an IAB network at a next time instant is received. The topological position includes a parent node and a donor node of the IAB node.

Next, in step S1620, the switching notification is sent to the IAB node, so that the IAB node is connected to both the electronic device 600 and the donor node at the next time instant on a control plane.

In an embodiment, the wireless communication method further includes sending a historical topological position of the IAB node to a network side device, for the network side device to determine the topological position of the IAB node at the next time instant.

In an embodiment, sending the switching notification includes sending the switching notification through an RRC reconfiguration message.

In an embodiment, the wireless communication method further includes: in response to a switching success message from the donor node at the next time instant, switch the IAB node from the electronic device 600 to the donor node at the next time instant on a user plane.

In an embodiment, the wireless communication method further includes: in response to a release message from the donor node at the next time instant, release connection with the IAB node on the control plane.

According to the embodiments of the present disclosure, the above method may be performed by the electronic device 600 according to the embodiments of the present disclosure, and thus all the embodiments of the electronic device 600 described above are applicable to this.

Next, a wireless communication method performed by the electronic device 800 for an IAB node in a wireless communication system according to an embodiment of the present disclosure is described in detail.

Figure 17:
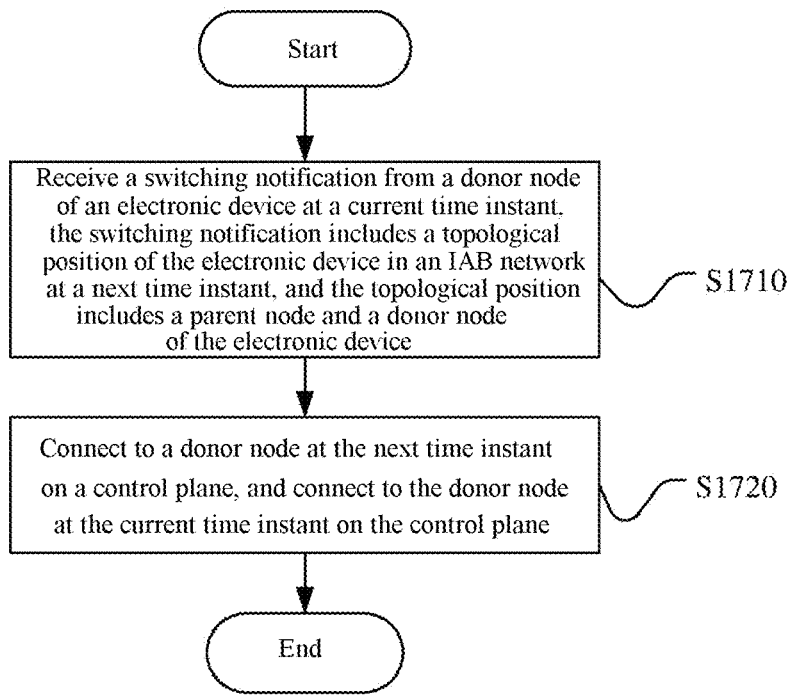
FIG. 17 is a flow chart showing a wireless communication method performed by an electronic device for an IAB node according to an embodiment of the present disclosure.

FIG. 17 is a flow chart showing a wireless communication method performed by an electronic device 800 for an IAB node in a wireless communication system according to an embodiment of the present disclosure.

As shown in FIG. 17, in step S1710, a switching notification is received from a donor node of the electronic device 800 at a current time instant. The switching notification includes a topological position of the electronic device in an IAB network at a next time instant. The topological position includes a parent node and a donor node of the electronic device 800.

Next, in step S1720, the donor node at the next time instant is connected on a control plane, and the donor node at the current time instant is connected on the control plane.

In an embodiment, the connecting the donor node at the next time instant on a control plane includes performing a random access process to connect a mobile terminal (MT) unit in the electronic device 800 to the parent node at the next time instant.

In an embodiment, the connecting the donor node at the next time instant on a control plane includes connecting a distributed unit (DU) in the electronic device 800 to the donor node at the next time instant on the control plane.

According to the embodiments of the present disclosure, the above method may be performed by the electronic device 800 according to the embodiments of the present disclosure, and thus all the embodiments of the electronic device 800 described above are applicable to this.

Next, a wireless communication method performed by the electronic device 1200 for a user equipment in a wireless communication system according to an embodiment of the present disclosure is described in detail.

Figure 18:
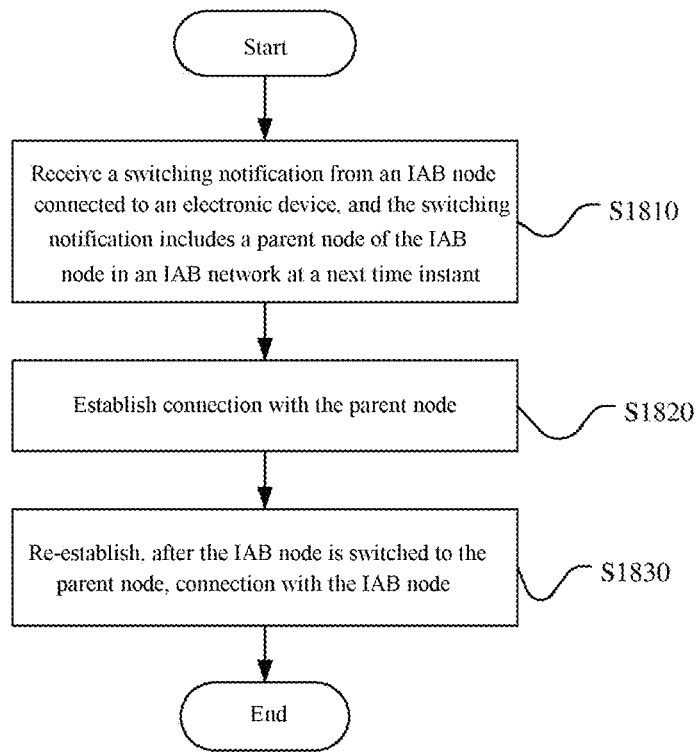
FIG. 18 is a flow chart showing a wireless communication method performed by an electronic device for a user equipment according to an embodiment of the present disclosure.

FIG. 18 is a flow chart showing a wireless communication method performed by an electronic device 1200 for a user equipment in a wireless communication system according to an embodiment of the present disclosure.

As shown in FIG. 18, in step S1810, a switching notification is received from an IAB node connected to the electronic device 1200. The switching notification includes a parent node of the IAB node in an IAB network at a next time instant.

Next, in step S1820, connection with the parent node is established.

Next, in step S1830, after the IAB node is switched to the parent node, connection with the IAB node is re-established.

In an embodiment, the receiving a switching notification includes receiving the switching notification through an RRC reconfiguration message.

In an embodiment, the establishing connection with the parent node includes performing a random access process to establish connection with the parent node.

In an embodiment, the re-establishing, connection with the IAB node includes performing a random access process to re-establish connection with the IAB node.

According to the embodiments of the present disclosure, the above method may be performed by the electronic device 1200 according to the embodiments of the present disclosure, and thus all the embodiments of the electronic device 1200 described above are applicable to this.

7. Application Examples

The technology of the present disclosure may be applied to various products.

For example, the electronic device 400 for the core network may be implemented as any type of server, such as a tower server, a rack server, and a blade server. The electronic device 400 may be a control module (such as an integrated circuitry module including a single die, and a card or blade inserted into a slot of a blade server) mounted on a server.

The electronic device 600 for the IAB host node and the electronic device 800 for the IAB node may be implemented as network side devices. The network side device may further be implemented as any type of base station device, such as macro eNB and small eNB, and may further be implemented as any type of gNB (a base station in a 5G system). The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The station base may include: a main body (also referred to as a base station device) configured to control wireless communication; and one or more remote radio heads (RRH) arranged at positions different from the main body. In addition, the electronic device 800 for the IAB node may be an electronic device that has some functions of the base station device independent of the base station device. The electronic device may be capable of sending and receiving data, and may be connected to UE through an access link and connected to other IAB nodes or donor nodes through a backhaul link.

The user equipment may be implemented as a mobile terminal (such as a smart phone, a tablet personal computer (PC), a notebook PC, a portable game terminal, a portable/dongle mobile router and a digital camera) or a vehicle terminal (such as a car navigation apparatus). The user equipment may further be implemented as a terminal (also known as machine type communication (MTC) terminal) that performs machine to machine (M2M) communication. In addition, the user equipment may be a wireless communication module (such as an integrated circuit module including one chip) installed on each of the above terminals.

Application Example On Server

Figure 19:
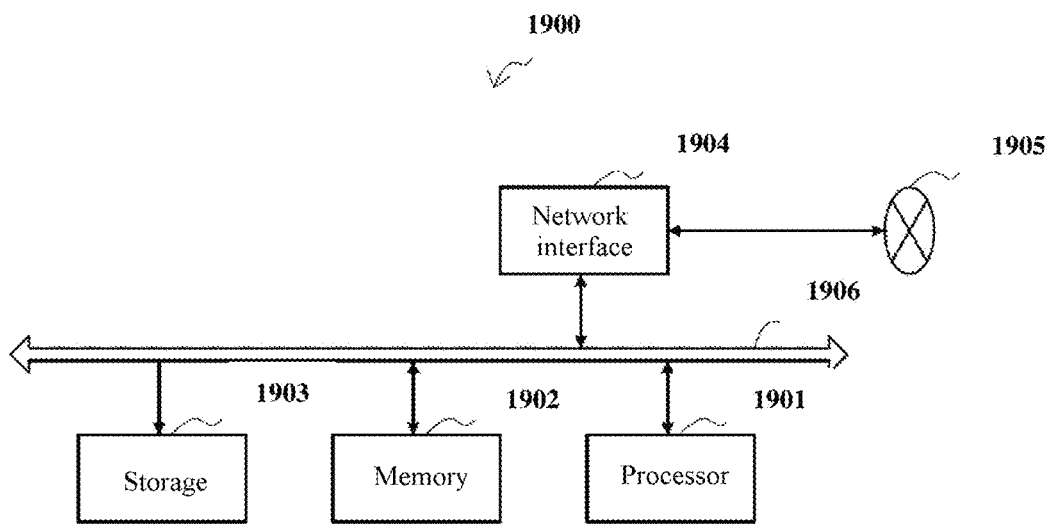
FIG. 19 is a block diagram showing an example of a server implementing an electronic device according to the present disclosure.

FIG. 19 is a block diagram showing an example of a server 1900 implementing an electronic device 400 according to the present disclosure. The server 1900 includes a processor 1901, a memory 1902, a storage 1903, a network interface 1904, and a bus 1906.

The processor 1901 may be, for example, a central processing unit (CPU) or a digital signal processor (DSP), and controls functions of the server 1900. The memory 1902 includes a random access memory (RAM) and a read only memory (ROM), and stores a program that is executed by the processor 1901 and data. The storage 1903 may include a storage medium such as a semiconductor memory and a hard disk.

The network interface 1904 is a wired communication interface for connecting the server 1900 to a wired communication network 1905. The wired communication network 1905 may be a core network such as an evolved packet core network (EPC) or a packet data network (PDN) such as the Internet.

The bus 1906 connects the processor 1901, the memory 1902, the storage 1903, and the network interface 1904 to each other. The bus 1906 may include two or more buses each having a different speed (such as a high speed bus and a low speed bus).

In the server 1900 shown in FIG. 19, the determination unit 410, the request generation unit 420, the notification generation unit 430, and the storage unit 450 shown in FIG. 4 may be implemented by the processor 1901, and the communication unit 440 shown in FIG. 4 may be implemented by the network interface 1904. For example, the processor 1901 may perform the following functions: determining the topological position of the IAB node, generating the switching request, generating the switching notification, and storing the geographical position of the IAB node, by executing instructions stored in the memory 1902 or the storage 1903.

Application Example On Base Station

First Application Example

Figure 20:
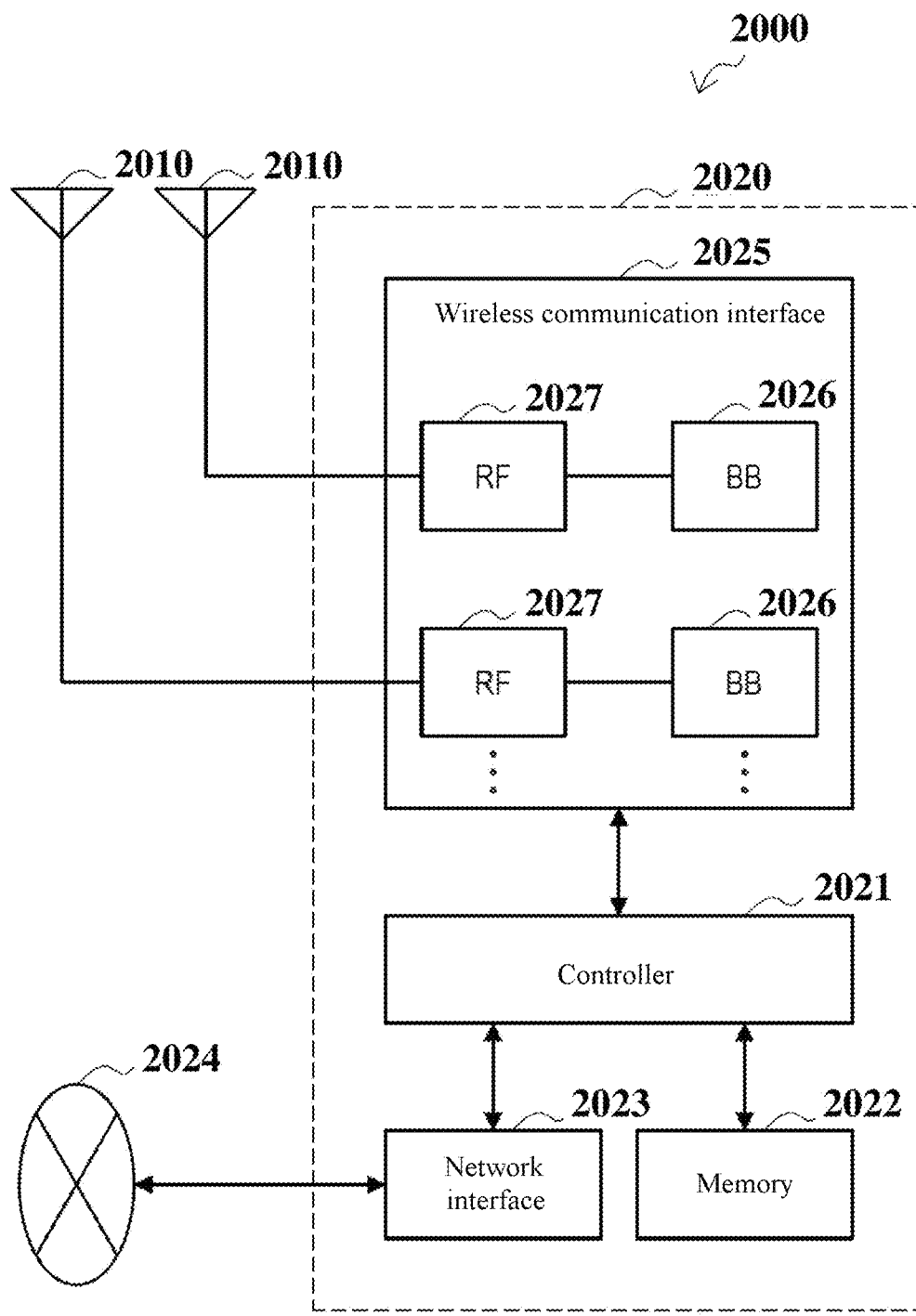
FIG. 20 is a block diagram showing a first schematic configuration example of an evolved node B (eNB)

FIG. 20 is a block diagram showing a first schematic configuration example of an eNB to which the technology of the present disclosure may be applied. An eNB 2000 includes one or more antennas 2010 and a base station device 2020. The base station device 2020 and each antenna 2010 may be connected to each other via an RF cable.

Each of the antennas 2010 includes a single or multiple antenna elements (such as multiple antenna elements included in a multi-input multi-output (MIMO) antenna), and is used for the base station device 2020 to send and receive wireless signals. As shown in FIG. 20, the eNB 2000 may include the multiple antennas 2010. For example, the multiple antennas 2010 may be compatible with multiple frequency bands used by the eNB 2000. Although FIG. 20 shows the example in which the eNB 2000 includes the multiple antennas 2010, the eNB 2000 may also include a single antenna 2010.

The base station device 2020 includes a controller 2021, a memory 2022, a network interface 2023, and a wireless communication interface 2025.

The controller 2021 may be, for example, a CPU or a DSP, and operates various functions of a higher layer of the base station device 2020. For example, the controller 2021 generates a data packet from data in signals processed by the wireless communication interface 2025, and transfers the generated packet via the network interface 2023. The controller 2021 may bundle data from multiple base band processors to generate the bundled packet, and transfer the generated bundled packet. The controller 2021 may have logical functions of performing control such as radio resource control, radio bearer control, mobility management, admission control and scheduling. The control may be performed in corporation with an eNB or a core network node in the vicinity. The memory 2022 includes a RAM and a ROM, and stores a program executed by the controller 2021, and various types of control data (such as a terminal list, transmission power data, and scheduling data).

The network interface 2023 is a communication interface for connecting the base station device 2020 to a core network 2024. The controller 2021 may communicate with a core network node or another eNB via the network interface 2023. In this case, the eNB 2000, and the core network node or the other eNB may be connected to each other via a logical interface (such as an S1 interface and an X2 interface). The network interface 2023 may also be a wired communication interface or a wireless communication interface for wireless backhaul. If the network interface 2023 is a wireless communication interface, the network interface 2023 may use a higher frequency band for wireless communication than a frequency band used by the wireless communication interface 2025.

The wireless communication interface 2025 supports any cellular communication scheme (such as Long Term Evolution (LTE) and LTE-Advanced), and provides wireless connection to a terminal positioned in a cell of the eNB 2000 via the antenna 2010. The wireless communication interface 2025 may typically include, for example, a BB processor 2026 and an RF circuit 2027. The BB processor 2026 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 2026 may have a part or all of the above-described logical functions instead of the controller 2021. The processor 2026 may be a memory that stores a communication control program, or a module that includes a processor and a related circuit configured to execute the program. Updating the program may allow the functions of the BB processor 2026 to be changed. The module may be a card or a blade that is inserted into a slot of the base station device 2020. Alternatively, the module may also be a chip that is mounted on the card or the blade. Meanwhile, the RF circuit 2027 may include, for example, a mixer, a filter, and an amplifier, and transmits and receives wireless signals via the antenna 2010.

As shown in FIG. 20, the wireless communication interface 2025 may include the multiple BB processors 2026. For example, the multiple BB processors 2026 may be compatible with multiple frequency bands used by the eNB 2000. As shown in FIG. 20, the wireless communication interface 2025 may include the multiple RF circuits 2027. For example, the multiple RF circuits 2027 may be compatible with multiple antenna elements. Although FIG. 20 shows the example in which the wireless communication interface 2025 includes the multiple BB processors 2026 and the multiple RF circuits 2027, the wireless communication interface 2025 may also include a single BB processor 2026 or a single RF circuit 2027.

Second Application Example

Figure 21:
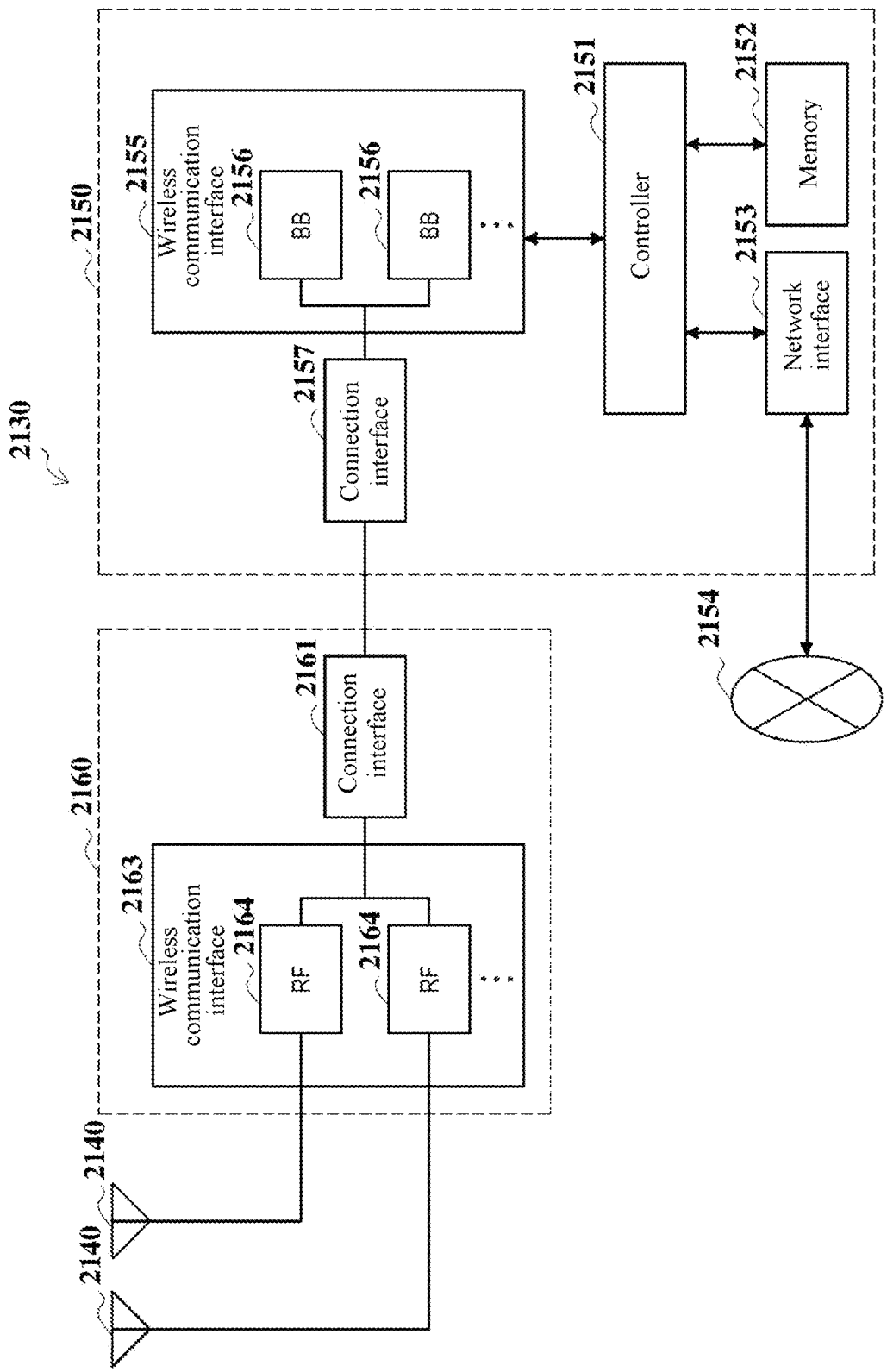
FIG. 21 is a block diagram showing a second schematic configuration example of an eNB.

FIG. 21 is a block diagram showing a second schematic configuration example of the eNB to which the technology of the present disclosure may be applied. An eNB 2130 includes one or more antennas 2140, a base station device 2150, and an RRH 2160. The RRH 2160 and each antenna 2140 may be connected to each other via an RF cable. The base station device 2150 and the RRH 1660 may be connected to each other via a high speed line such as an optical fiber cable.

Each of the antennas 2140 includes a single or multiple antenna elements (such as multiple antenna elements included in an MIMO antenna), and is used for the RRH 2160 to transmit and receive wireless signals. As shown in FIG. 21, the eNB 2130 may include the multiple antennas 2140. For example, the multiple antennas 2140 may be compatible with multiple frequency bands used by the eNB 2130. Although FIG. 21 shows the example in which the eNB 2130 includes the multiple antennas 2140, the eNB 2130 may also include a single antenna 2140.

The base station device 2150 includes a controller 2151, a memory 2152, a network interface 2153, a wireless communication interface 2155, and a connection interface 2157. The controller 2151, the memory 2152, and the network interface 2153 are the same as the controller 2021, the memory 2022, and the network interface 2023 described with reference to FIG. 20. The network interface 2153 is a communication interface for connecting the base station device 2150 to a core network 2154.

The wireless communication interface 2155 supports any cellular communication scheme (such as LTE and LTE-Advanced), and provides wireless communication to a terminal positioned in a sector corresponding to the RRH 2160 via the RRH 2160 and the antenna 2140. The wireless communication interface 2155 may typically include, for example, a BB processor 2156. The BB processor 2156 is the same as the BB processor 2026 described with reference to FIG. 20, except that the BB processor 2156 is connected to an RF circuit 2164 of the RRH 2160 via the connection interface 2157. As shown in FIG. 21, the wireless communication interface 2155 may include the multiple BB processors 2156. For example, the multiple BB processors 2156 may be compatible with multiple frequency bands used by the eNB 2130. Although FIG. 21 shows the example in which the wireless communication interface 2155 includes the multiple BB processors 2156, the wireless communication interface 2155 may also include a single BB processor 2156.

The connection interface 2157 is an interface for connecting the base station device 2150 (wireless communication interface 2155) to the RRH 2160. The connection interface 2157 may also be a communication module for performing communication in the above-described high speed line that connects the base station device 2150 (wireless communication interface 2155) to the RRH 2160.

The RRH 2160 includes a connection interface 2161 and a wireless communication interface 1963.

The connection interface 2161 is an interface for connecting the RRH 2160 (wireless communication interface 1963) to the base station apparatus 2150. The connection interface 2161 may also be a communication module for performing communication in the above-described high speed line.

The wireless communication interface 2163 transmits and receives wireless signals via the antenna 2140. The wireless communication interface 2163 may typically include, for example, the RF circuit 2164. The RF circuit 2164 may include, for example, a mixer, a filter, and an amplifier, and transmits and receives wireless signals via the antenna 2140. As shown in FIG. 21, the wireless communication interface 2163 may include multiple RF circuits 2164. For example, the multiple RF circuits 2164 may support multiple antenna elements. Although FIG. 21 shows the example in which the wireless communication interface 2163 includes the multiple RF circuits 2164, the wireless communication interface 2163 may also include a single RF circuit 2164.

In the eNB 2000 and the eNB 2130 respectively shown in FIG. 20 and FIG. 21, the determination unit 610, the generation unit 620, the generation unit 640, the switching unit 650 and the release unit 660 shown in FIG. 6, and the determination unit 810 and the connection unit 820 shown in FIG. 8 may be implemented by the controller 2021 and/or the controller 2151. At least part of the functions may be implemented by the controller 2021 and the controller 2151. For example, the controller 2021 and/or the controller 2151 may perform the following functions: determining the topological position of the IAB node, generating the switching notification, generating the topological position of the IAB node, switching the IAB node to the target donor node on the user plane, releasing the connection with the IAB node on the control plane, and connecting to the target donor node and the source donor node on the control plane by executing the instructions stored in the corresponding memory.

Application Example On Terminal Device

First Application Example

Figure 22:
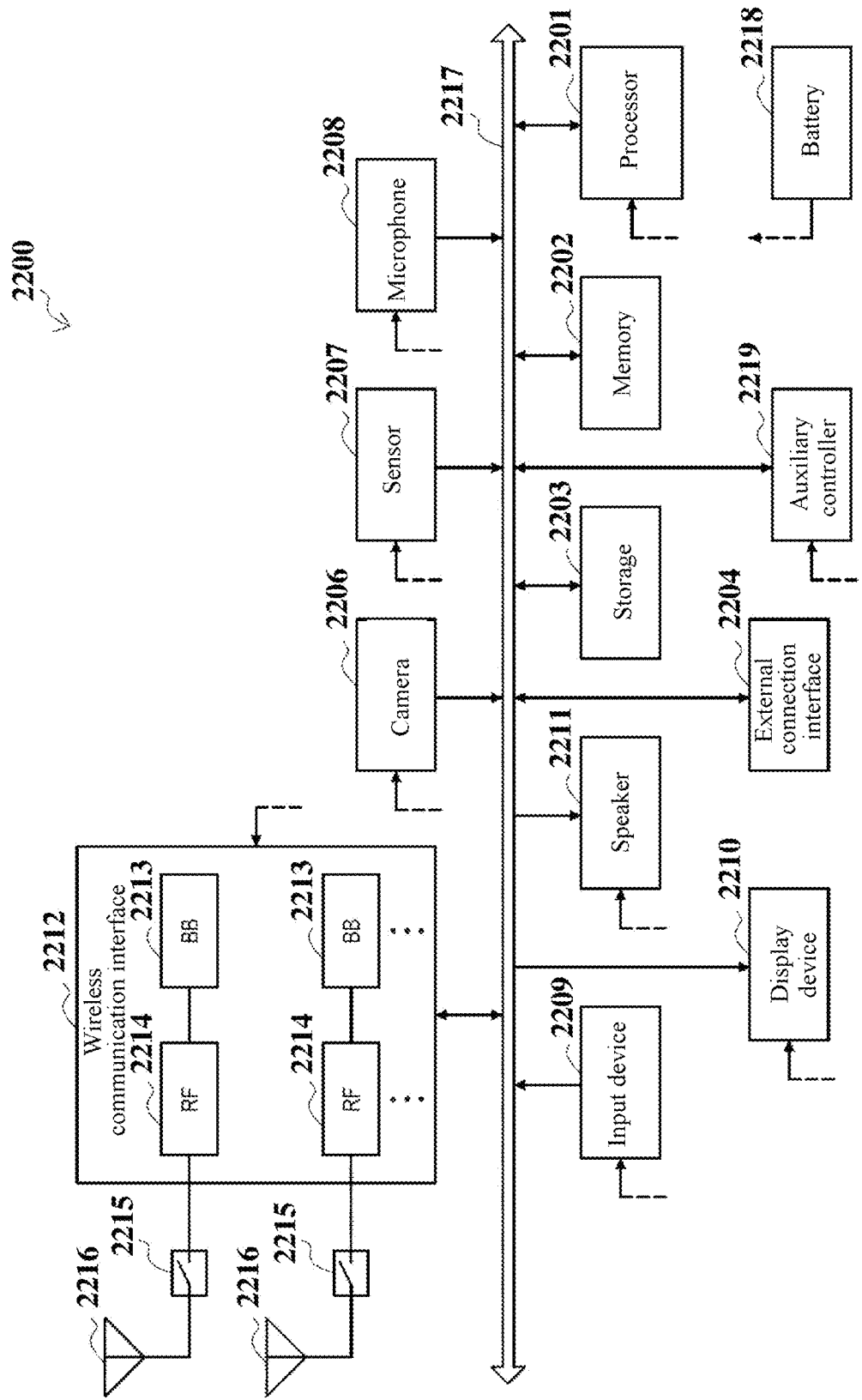
FIG. 22 is a block diagram showing a schematic configuration example of a smart phone.

FIG. 22 is a block diagram showing a schematic configuration example of a smart phone 2200 to which the technology of the present disclosure may be applied. The smart phone 2200 includes a processor 2201, a memory 2202, a storage 2203, an external connection interface 2204, a camera 2206, a sensor 2207, a microphone 2208, an input device 2209, a display device 2210, a speaker 2211, a wireless communication interface 2212, one or more antenna switches 2215, one or more antennas 2216, a bus 2217, a battery 2218, and an auxiliary controller 2219.

The processor 2201 may be, for example, a CPU or a system on a chip (SoC), and controls functions of an application layer and another layer of the smart phone 2200. The memory 2202 includes RAM and ROM, and stores a program executed by the processor 2201 and data. The storage 2203 may include a storage medium such as a semiconductor memory and a hard disk. The external connection interface 2204 is an interface for connecting an external apparatus (such as a memory card and a universal serial bus (USB) apparatus) to the smart phone 2200.

The camera 2206 includes an image sensor (such as a charge coupled device (CCD) and a complementary metal oxide semiconductor (CMOS)), and generates a captured image. The sensor 2207 may include a group of sensors such as a measurement sensor, a gyro sensor, a geomagnetic sensor, and an acceleration sensor. The microphone 2208 converts sounds that are inputted to the smart phone 2200 to audio signals. The input device 2209 includes, for example, a touch sensor configured to detect touch onto a screen of the display device 2210, a keypad, a keyboard, a button, or a switch, and receive an operation or information inputted from a user. The display device 2210 includes a screen (such as a liquid crystal display (LCD) and an organic light-emitting diode (OLED) display), and displays an output image of the smart phone 2200. The speaker 2211 converts audio signals that are outputted from the smart phone 2200 to sounds.

The wireless communication interface 2212 supports any cellular communication scheme (such as LTE and LTE-Advanced), and performs wireless communication. The wireless communication interface 2212 may typically include, for example, a BB processor 2213 and a RF circuit 2214. The BB processor 2213 may perform, for example, encoding/decoding, modulating/demodulating, and multiplexing/demultiplexing, and performs various types of signal processing for wireless communication. In addition, the RF circuit 2214 may include, for example, a mixer, a filter, and an amplifier, and transmits and receives wireless signals via the antenna 2216. The wireless communication interface 2212 may be a chip module having the BB processor 2213 and the RF circuit 2214 integrated thereon. As shown in FIG. 22, the wireless communication interface 2212 may include multiple BB processors 2213 and multiple RF circuits 2214. Although FIG. 22 shows the example in which the wireless communication interface 2212 includes the multiple BB processors 2213 and the multiple RF circuits 2214, the wireless communication interface 2212 may also include a single BB processor 2213 or a single RF circuit 2214.

Furthermore, in addition to a cellular communication scheme, the wireless communication interface 2212 may support another type of wireless communication scheme such as a short-distance wireless communication scheme, a near field communication scheme, and a wireless local area network (LAN) scheme. In this case, the wireless communication interface 2212 may include the BB processor 2213 and the RF circuit 2214 for each wireless communication scheme.

Each of the antenna switches 2215 switches connection destinations of the antennas 2216 among multiple circuits (such as circuits for different wireless communication schemes) included in the wireless communication interface 2212.

Each of the antennas 2216 includes a single or multiple antenna elements (such as multiple antenna elements included in an MIMO antenna), and is used for the wireless communication interface 2212 to transmit and receive wireless signals. As shown in FIG. 22, the smart phone 2200 may include the multiple antennas 2216. Although FIG. 22 shows the example in which the smart phone 2200 includes the multiple antennas 2216, the smart phone 2200 may also include a single antenna 2216.

Furthermore, the smart phone 2200 may include the antenna 2216 for each wireless communication scheme. In this case, the antenna switches 2215 may be omitted from the configuration of the smart phone 2200.

The bus 2217 connects the processor 2201, the memory 2202, the storage 2203, the external connection interface 2204, the camera 2206, the sensor 2207, the microphone 2208, the input device 2209, the display device 2210, the speaker 2211, the wireless communication interface 2212, and the auxiliary controller 2219 to each other. The battery 2218 supplies power to blocks of the smart phone 2200 shown in FIG. 22 via feeder lines that are partially shown as dashed lines in the FIG. 22. The auxiliary controller 2219 operates a minimum necessary function of the smart phone 2200, for example, in a sleep mode.

In the smart phone 2200 shown in FIG. 22, the determination unit 1210 and the connection unit 1220 shown in FIG. 12 may be implemented by the processor 2201 or the auxiliary controller 2219. At least part of functions may also be implemented by the processor 2201 or the auxiliary controller 2219. For example, the processor 2201 or the auxiliary controller 2219 may perform the following functions: determining the target parent node of the IAB node, establishing connection with the target parent node, and establishing connection with the IAB node by executing instructions stored in the memory 2202 or the storage 2203.

Second Application Example

Figure 23:
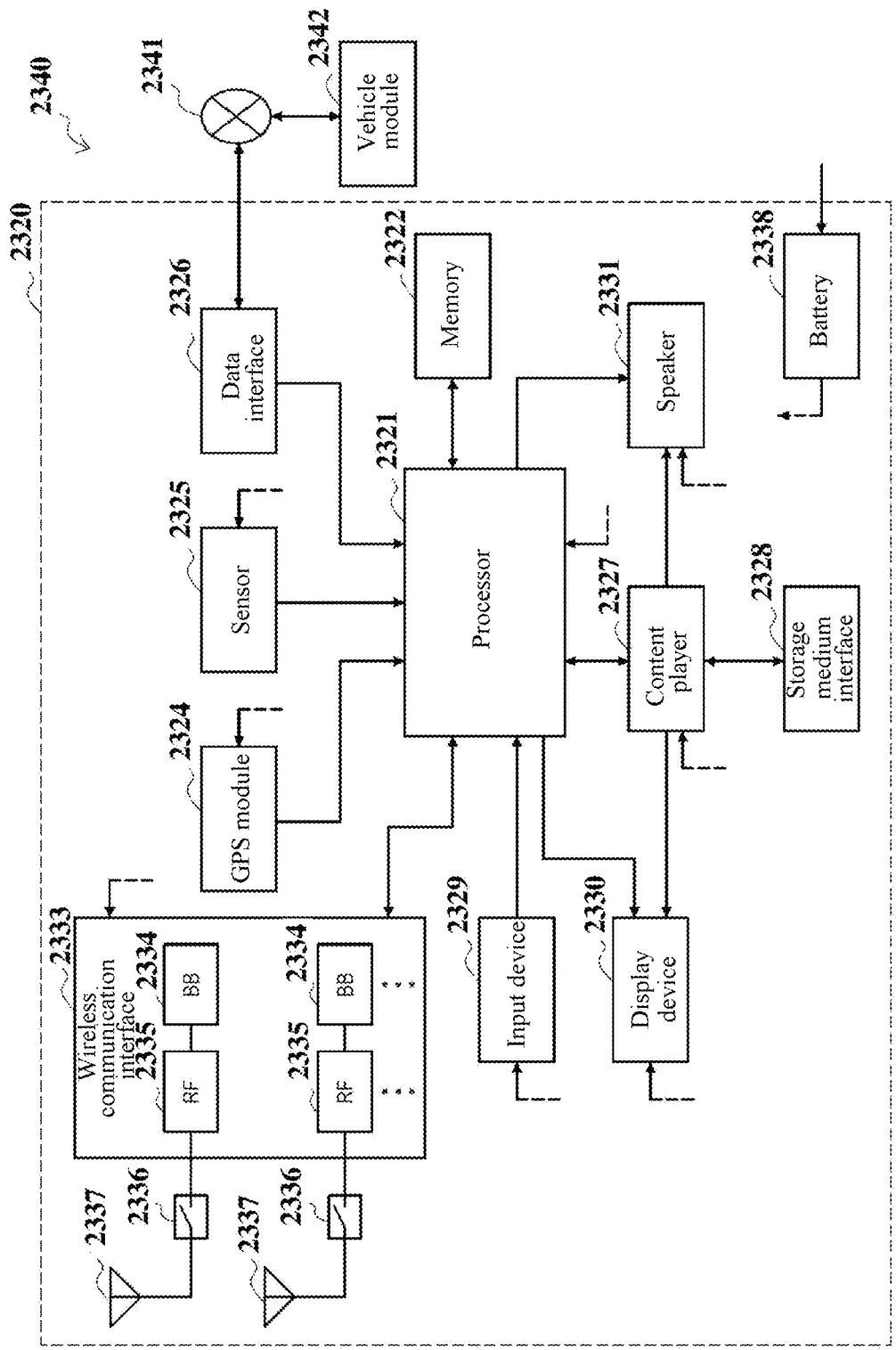
FIG. 23 is a block diagram showing a schematic configuration example of a car navigation apparatus.

FIG. 23 is a block diagram showing a schematic configuration example of a car navigation apparatus 2320 to which the technology of the present disclosure may be applied. The car navigation apparatus 2320 includes a processor 2321, a memory 2322, a global positioning system (GPS) module 2324, a sensor 2325, a data interface 2326, a content player 2327, a storage medium interface 2328, an input device 2329, a display device 2330, a speaker 2331, a wireless communication interface 2333, one or more antenna switches 2336, one or more antennas 2337, and a battery 2338.

The processor 2321 may be, for example, a CPU or a SoC, and controls a navigation function and another function of the car navigation apparatus 2320. The memory 2322 includes a RAM and a ROM, and stores a program executed by the processor 2321 and data.

The GPS module 2324 determines a position (such as latitude, longitude, and altitude) of the car navigation apparatus 2320 by using GPS signals received from a GPS satellite. The sensor 2325 may include a group of sensors such as a gyro sensor, a geomagnetic sensor, and an air pressure sensor. The data interface 2326 is connected to, for example, an in-vehicle network 2341 via a terminal that is not shown, and acquires data (such as vehicle speed data) generated by the vehicle.

The content player 2327 reproduces content stored in a storage medium (such as a CD and a DVD) that is inserted into the storage medium interface 2328. The input device 2329 includes, for example, a touch sensor configured to detect touch onto a screen of the display device 2330, a button or a switch, and receives an operation or information inputted from a user. The display device 2330 includes a screen such as a LCD or an OLED display, and displays an image of the navigation function or content that is reproduced. The speaker 2331 outputs sounds of the navigation function or the content that is reproduced.

The wireless communication interface 2333 supports any cellular communication scheme (such as LTE and LTE-Advanced), and performs wireless communication. The wireless communication interface 2333 may typically include, for example, a BB processor 2334 and an RF circuit 2335. The BB processor 2334 may perform, for example, encoding/decoding, modulating/demodulating, and multiplexing/demultiplexing, and performs various types of signal processing for wireless communication. Meanwhile, the RF circuit 2335 may include, for example, a mixer, a filter, and an amplifier, and transmits and receives wireless signals via the antenna 2337. The wireless communication interface 2333 may also be a chip module having the BB processor 2334 and the RF circuit 2335 integrated thereon. As shown in FIG. 23, the wireless communication interface 2333 may include the multiple BB processors 2334 and the multiple RF circuits 2335. Although FIG. 23 shows the example in which the wireless communication interface 2333 includes the multiple BB processors 2334 and the multiple RF circuits 2335, the wireless communication interface 2333 may also include a single BB processor 2334 or a single RF circuit 2335.

Furthermore, in addition to the cellular communication scheme, the wireless communication interface 2333 may support another type of wireless communication scheme such as a short-distance wireless communication scheme, a near field communication scheme, and a wireless LAN scheme. In this case, the wireless communication interface 2333 may include the BB processor 2334 and the RF circuit 2335 for each wireless communication scheme.

Each of the antenna switches 2336 switches connection destinations of the antennas 2337 among multiple circuits (such as circuits for different wireless communication schemes) included in the wireless communication interface 2333.

Each of the antennas 2337 includes a single or multiple antenna elements (such as multiple antenna elements included in an MIMO antenna), and is used for the wireless communication interface 2333 to transmit and receive wireless signals. As shown in FIG. 23, the car navigation apparatus 2320 may include the multiple antennas 2337. Although FIG. 23 shows the example in which the car navigation apparatus 2320 includes the multiple antennas 2337, the car navigation apparatus 2320 may also include a single antenna 2337.

Furthermore, the car navigation apparatus 2320 may include the antenna 2337 for each wireless communication scheme. In this case, the antenna switches 2336 may be omitted from the configuration of the car navigation apparatus 2320.

The battery 2338 supplies power to blocks of the car navigation apparatus 2320 shown in FIG. 23 via feeder lines that are partially shown as dashed lines in the FIG. 23. The battery 2338 accumulates power supplied from the vehicle.

In the car navigation apparatus 2320 shown in FIG. 23, the determination unit 1210 and the connection unit 1220 shown in FIG. 12 may be implemented by the processor 2321. At least part of the functions may be implemented by the processor 2321. For example, the processor 2321 may perform the following functions: determining the target parent node of the IAB node, establishing connection with the target parent node, and establishing connection with the IAB node, by executing the instructions stored in the memory 2322.

The technology of the present disclosure may also be implemented as an in-vehicle system (or a vehicle) 2340 including one or more blocks of the car navigation apparatus 2320, the in-vehicle network 2341 and a vehicle module 2342. The vehicle module 2342 generates vehicle data (such as a vehicle speed, an engine speed or failure information), and outputs the generated data to the in-vehicle network 2341.

The preferred embodiments of the present disclosure are described above with reference to the drawings. The present disclosure is not limited to the above embodiments. Those skilled in the art may make various changes and modifications within the scope of the appended claims. It should be understood that such changes and modifications should fall within the technical scope of the present disclosure.

For example, in the functional block diagrams shown in the drawings, a unit shown in dotted lines indicates that the functional unit is optional in the device, and optional functional units may be combined in an appropriate way to implement a required function.

For example, in the above embodiments, multiple functions in one unit may be implemented by independent devices. Alternatively, in the above embodiments, multiple functions in multiple units may be respectively implemented by independent devices. In addition, one of the above functions may be implemented by multiple units. Needless to say, such configuration is within the technical scope of the present disclosure.

In the present disclosure, steps described in the flow charts are not limited to be performed in a chronological order, but may also be performed in parallel or independently rather than necessarily being in the time order. In addition, in a case that the steps are performed in the chronological order, needless to say, the order may also be changed appropriately.

Although the embodiments of the present disclosure are described above in conjunction with the drawings, it should be understood that the embodiments are only used to illustrate the present disclosure rather than limit the present disclosure. For those skilled in the art, various changes and modifications may be made for the embodiments without departing from the essence and scope of the present disclosure. Therefore, the scope of the present disclosure is defined only by appended claims and equivalent meaning thereof.

The invention claimed is:

1. An electronic device, comprising processing circuitry configured to:
   determine a topological position of an integrated access and backhaul (IAB) node in an IAB network at a next time instant according to a historical geographical position and a historical topological position of the IAB node, the topological position comprising a parent node and a donor node of the IAB node;
   send a switching request to the donor node of the IAB node at the next time instant, to request that the IAB node is switched at the next time instant to the parent node and the donor node at the next time instant; and
   send a switching notification to a donor node of the IAB node at a current time instant, the switching notification comprising the topological position of the IAB node at the next time instant, so that the IAB node is connected to both the donor node at the current time instant and the donor node at the next time instant on a control plane.

2. The electronic device according to claim 1, wherein the processing circuitry is further configured to:
   determine a geographical position of the IAB node at the next time instant based on the historical geographical position of the LAB node; and
   determine the topological position of the IAB node at the next time instant according to the geographical position of the IAB node at the next time instant and the historical topological position of the IAB node.

3. The electronic device according to claim 1, wherein the processing circuitry is further configured to:
   receive the historical topological position of the LAB node from the donor node at the current time instant.

4. The electronic device according to claim 1, wherein the processing circuitry is further configured to:
   receive a switching response from the donor node at the next time instant, to determine that the LAB node is allowed, at the next time instant, to be switched to the parent node and the donor node at the next time instant.

5. An electronic device, comprising processing circuitry configured to:
   receive a switching notification that comprises a topological position of an integrated access and backhaul (IAB) node in an IAB network at a next time instant that is determined according to a historical geographical position and a historical topological position of the IAB node, the topological position comprising a parent node and a donor node of the IAB node; and
   send the switching notification to the IAB node, so that the IAB node is connected to both the electronic device and the donor node at the next time instant on a control plane.

6. The electronic device according to claim 5, wherein the processing circuitry is further configured to:
   send a historical topological position of the IAB node to a network side device, for the network side device to determine the topological position of the IAB node at the next time instant.

7. The electronic device according to claim 5, wherein the processing circuitry is further configured to:
   send the switching notification through an RRC reconfiguration message.

8. The electronic device according to claim 5, wherein the processing circuitry is further configured to:
   in response to a switching success message from the donor node at the next time instant, switch the IAB node from the electronic device to the donor node at the next time instant on a user plane.

9. The electronic device according to claim 5, wherein the processing circuitry is further configured to:
   in response to a release message from the donor node at the next time instant, release connection with the IAB node on the control plane.

10. An electronic device, comprising processing circuitry configured to:
   receive a switching notification from a donor node of the electronic device at a current time instant, wherein the switching notification comprises a topological position of the electronic device in an integrated access and backhaul (IAB) network at a next time instant that is determined according to a historical geographical position and a historical topological position of the IAB node, and the topological position comprises a parent node and a donor node of the electronic device; and connect to the donor node at the next time instant on a control plane, and connect to the donor node at the current time instant on the control plane.

11. The electronic device according to claim 10, wherein the processing circuitry is further configured to:

perform a random access process to connect a mobile terminal (MT) unit in the electronic device to the parent node at the next time instant.

12. The electronic device according to claim 10, wherein the processing circuitry is further configured to:

connect a distributed unit (DU) in the electronic device to the donor node at the next time instant on the control plane.

* * * * *